(12) United States Patent
Shibazaki et al.

(10) Patent No.: US 6,625,712 B2
(45) Date of Patent: Sep. 23, 2003

(54) MEMORY MANAGEMENT TABLE PRODUCING METHOD AND MEMORY DEVICE

(75) Inventors: Shogo Shibazaki, Yokohama (JP); Takeshi Nagase, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 09/801,671

(22) Filed: Mar. 9, 2001

(65) Prior Publication Data

US 2001/0014933 A1 Aug. 16, 2001

Related U.S. Application Data

(63) Continuation of application No. PCT/JP99/02471, filed on May 13, 1999.

(30) Foreign Application Priority Data

Sep. 11, 1998 (JP) .......................................... 10-258216

(51) Int. Cl.[7] .............................................. G06F 12/00
(52) U.S. Cl. ...................... 711/202; 711/203; 711/204; 711/205; 711/206; 711/209; 711/152; 711/155
(58) Field of Search .................... 711/202–205, 206, 711/209, 152, 155, 215, 103

(56) References Cited

U.S. PATENT DOCUMENTS 5,113,512 A * 5/1992 Miki et al. ................. 711/206
5,524,230 A * 6/1996 Sakaue et al. ............... 711/103
5,530,828 A * 6/1996 Kaki et al. ............. 365/185.29
5,666,560 A * 9/1997 Moertl et al. .................. 710/68
5,740,396 A * 4/1998 Mason ................... 365/185.33
5,742,934 A * 4/1998 Shinohara .................... 711/103
5,809,515 A * 9/1998 Kaki et al. ............. 365/185.29
5,809,516 A * 9/1998 Ukai et al. ................... 711/113
5,822,784 A * 10/1998 Garney ........................ 711/115
5,963,983 A * 10/1999 Sakakura et al. ............ 711/103
6,119,226 A * 9/2000 Shiau et al. ................. 711/170

FOREIGN PATENT DOCUMENTS

| EP | 0 896 280 A2 | 2/1999 |
| JP | 9-282111 | 10/1997 |
| JP | 11-110283 | 4/1999 |

* cited by examiner

Primary Examiner—T. V. Nguyen
(74) Attorney, Agent, or Firm—Staas & Halsey LLP

(57) ABSTRACT

The present invention relates to a method of producing a memory management table that controls memories having a function to hold data at a time of power cut-off and manages identifier information of memory areas which are data storage destinations designated by a logical address issued by a host device. After an initializing process, the host device is immediately notified of canceling of a busy state, without production of the memory management table. Alternatively, only a part of the memory management table is produced and the host device is notified of the canceling of the busy state. After that, until the host device issues a process request, or when the host device is issuing a process request, an incomplete part of the memory management table is completed. Thus, the memory management table can be completed.

17 Claims, 26 Drawing Sheets

LOGICAL ADDRESS
* WHEN THERE IS NO DATA,
THE STORAGE AREA FOR LOGICAL
ADDRESS IS IN A DATA ERASED STATE.

FIG.3

| | ROW 0 (CHIP 0) | ROW 1 (CHIP 1) | ROW 2 (CHIP 2) | ROW 3 (CHIP 3) |
|---|---|---|---|---|
| LINE 0 | STORAGE DESTINATION BLOCK NUMBER OF LOGICAL ADDRESS "0" | STORAGE DESTINATION BLOCK NUMBER OF LOGICAL ADDRESS "1" | STORAGE DESTINATION BLOCK NUMBER OF LOGICAL ADDRESS "2" | STORAGE DESTINATION BLOCK NUMBER OF LOGICAL ADDRESS "3" |
| LINE 1 | STORAGE DESTINATION BLOCK NUMBER OF LOGICAL ADDRESS "4" | STORAGE DESTINATION BLOCK NUMBER OF LOGICAL ADDRESS "5" | STORAGE DESTINATION BLOCK NUMBER OF LOGICAL ADDRESS "6" | STORAGE DESTINATION BLOCK NUMBER OF LOGICAL ADDRESS "7" |
| LINE 2 | STORAGE DESTINATION BLOCK NUMBER OF LOGICAL ADDRESS "8" | STORAGE DESTINATION BLOCK NUMBER OF LOGICAL ADDRESS "9" | STORAGE DESTINATION BLOCK NUMBER OF LOGICAL ADDRESS "10" | STORAGE DESTINATION BLOCK NUMBER OF LOGICAL ADDRESS "11" |
| LINE 3 | STORAGE DESTINATION BLOCK NUMBER OF LOGICAL ADDRESS "12" | STORAGE DESTINATION BLOCK NUMBER OF LOGICAL ADDRESS "13" | STORAGE DESTINATION BLOCK NUMBER OF LOGICAL ADDRESS "14" | STORAGE DESTINATION BLOCK NUMBER OF LOGICAL ADDRESS "15" |
| ...... | ...... | ...... | ...... | ...... |

FIG.4

| | ROW 0 | ROW 1 | ROW 2 | ROW 3 | | |
|---|---|---|---|---|---|---|
| LINE 0 | STORAGE DESTINATION BLOCK NUMBER OF LOGICAL ADDRESS "0" | STORAGE DESTINATION BLOCK NUMBER OF LOGICAL ADDRESS "1" | STORAGE DESTINATION BLOCK NUMBER OF LOGICAL ADDRESS "2" | STORAGE DESTINATION BLOCK NUMBER OF LOGICAL ADDRESS "3" | | |
| .. | .. | .. | .. | .. | | |
| LINE 127 | STORAGE DESTINATION BLOCK NUMBER OF LOGICAL ADDRESS "508" | STORAGE DESTINATION BLOCK NUMBER OF LOGICAL ADDRESS "509" | STORAGE DESTINATION BLOCK NUMBER OF LOGICAL ADDRESS "510" | STORAGE DESTINATION BLOCK NUMBER OF LOGICAL ADDRESS "511" | | |
| LINE 28 | STORAGE DESTINATION BLOCK NUMBER OF LOGICAL ADDRESS "512" | STORAGE DESTINATION BLOCK NUMBER OF LOGICAL ADDRESS "513" | STORAGE DESTINATION BLOCK NUMBER OF LOGICAL ADDRESS "514" | STORAGE DESTINATION BLOCK NUMBER OF LOGICAL ADDRESS "515" | | |
| .. | .. | .. | .. | .. | | |
| LINE 255 | STORAGE DESTINATION BLOCK NUMBER OF LOGICAL ADDRESS "1020" | STORAGE DESTINATION BLOCK NUMBER OF LOGICAL ADDRESS "1021" | STORAGE DESTINATION BLOCK NUMBER OF LOGICAL ADDRESS "1022" | STORAGE DESTINATION BLOCK NUMBER OF LOGICAL ADDRESS "1023" | | |
| ...... | ...... | ...... | ...... | ...... | ...... | ...... |
| ...... | ...... | ...... | ...... | ...... | ...... | ...... |
| | CHIP 0 | | CHIP 1 | | CHIP 2 | CHIP 3 |

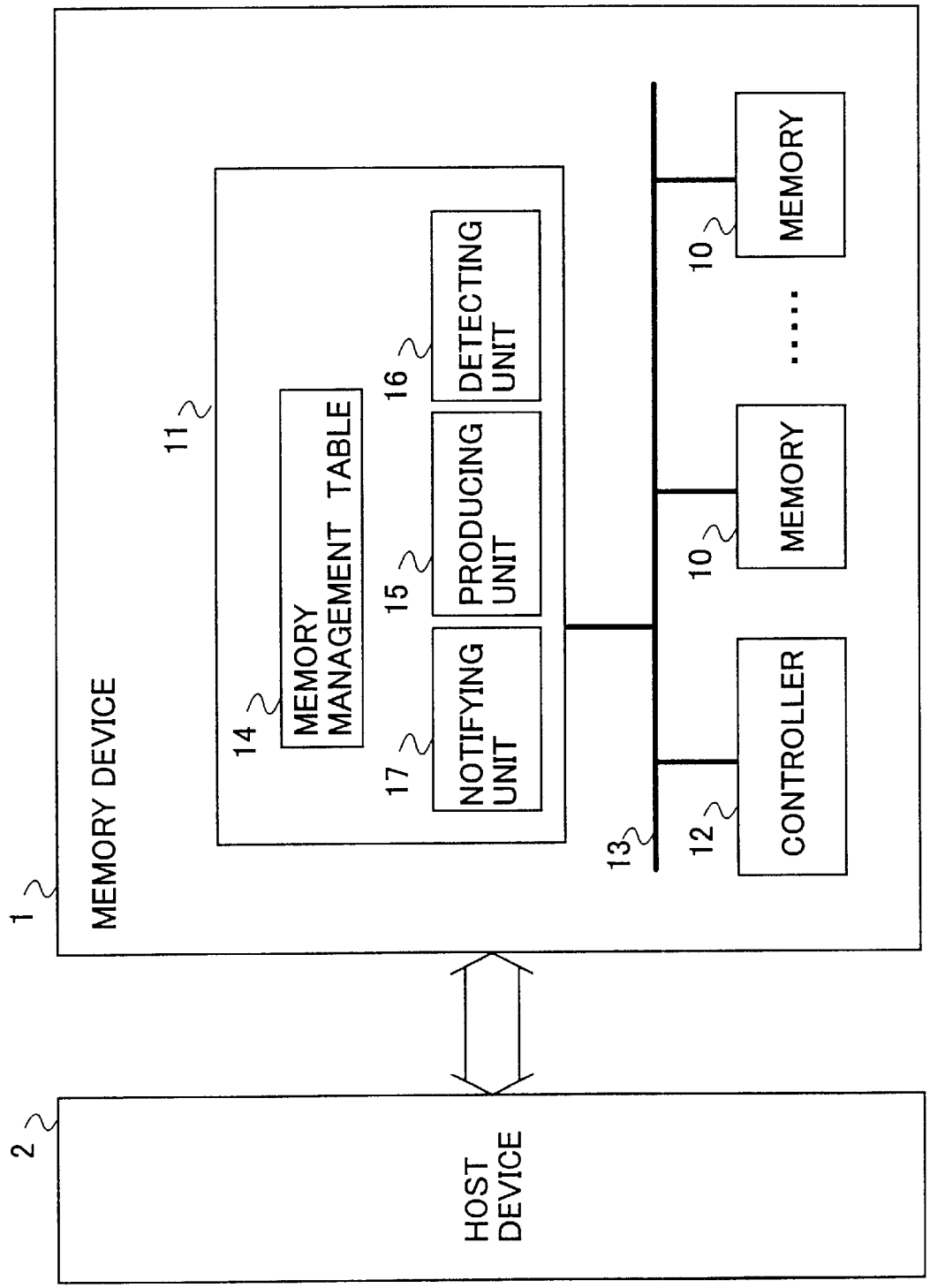

FIG.7

| BLOCK NUMBER | CHIP 0 | CHIP 1 | CHIP 2 | CHIP 3 |
|---|---|---|---|---|
| 0 | YES/NO | YES/NO | YES/NO | YES/NO |
| 1 | YES/NO | YES/NO | YES/NO | YES/NO |
| 2 | YES/NO | YES/NO | YES/NO | YES/NO |
| 3 | YES/NO | YES/NO | YES/NO | YES/NO |
| 4 | YES/NO | YES/NO | YES/NO | YES/NO |
| ⋮ | ⋮ | ⋮ | ⋮ | ⋮ |
| 510 | YES/NO | YES/NO | YES/NO | YES/NO |
| 511 | YES/NO | YES/NO | YES/NO | YES/NO |

BLOCK NUMBER STORAGE AREA

P BIT
  1: VACANT
  0: OCCUPIED OR INCOMPLETE
    ∗WHEN OCCUPIED
      REGULAR BLOCK NUMBERS IS REGISTERED
    ∗WHEN INCOMPLETE
      IRRECULAR BLOCK NUMBERS IS REGISTERD

MEMORY MANAGEMENT TABLE PRODUCING METHOD AND MEMORY DEVICE

This application is a continuing application, filed under 35 U.S.C. §111(a), of International Application PCT/JP99/02471, filed May 13, 1999, it being further noted that priority is based upon Japanese Patent Application 10-258216, filed Sep. 11, 1998.

TECHNICAL FIELD

The present invention relates to a method of producing a memory management table that has control over memories having a function to hold data at a time of power cut-off and manages identifier information of memory areas to be data storage destinations designated by a logical address issued by a host device, and to a memory device for which the method is employed. More particularly, the present invention relates to a method of producing a memory management table that reduces the start-up time of a memory device and ensures a system to start a normal operation, and to a memory device for which the method is employed.

BACKGROUND ART

When a non-volatile memory such as a flash memory, a FRAM, or a EEPROM, or a memory such as a RAM backed up by a battery is mounted on a memory card or the like, it is necessary to create a memory management table for managing the correspondence between the logical addresses of data and physical addresses so as to carry out an access request issued by a host computer.

A flash memory, for instance, is divided into 512 blocks that serve as data erase units, as shown in FIG. 1. Each of the blocks has eight sectors that serve as data storing units. The data stored in each sector (constituted by 512 bytes, for instance) is provided with a logical address issued by the host computer. As shown in FIG. 2, identical logical addresses are allocated to the data stored in one block.

A memory management table is prepared to manage the correspondence between logical addresses and block numbers so as perform a process of converting a logical address into a physical address. Referring now to FIGS. 3 and 4, an example case where four flash memories are mounted will be explained below.

In the memory management table shown in FIG. 3, there is a prerequisite that the data having logical addresses "0", "4", . . . are stored in the flash memory having a chip number "0", the data having logical addresses "1", "15", . . . are stored in the flash memory having a chip number "1", the data having logical addresses "2", "6", . . . are stored in the flash memory having a chip number "2", the data having logical addresses "3", "7", . . . are stored in the flash memory having a chip number "3", the data having logical addresses. The part of the table corresponding to the flash memory of the chip number "0" manages the storing destination block number of the logical address "0", the storing destination block number of the logical address "4", and so forth. The part of the table corresponding to the flash memory of the chip number "1" manages the storing destination block number of the logical address "1", the storing destination block number of the logical address "5", and so forth. The part of the table corresponding to the flash memory of the chip number "2" manages the storing destination block number of the logical address "2", the storing destination block number of the logical address "6", and so forth. The part of the table corresponding to the flash memory of the chip number "3" manages the storing destination bloc number of the logical address "3", the storing destination block number of the logical address "7", and so forth.

When an access request that specifies a logical address is issued from the host computer in accordance with the memory management table having the above data structure, the physical address of the access destination can be determined by pinpointing the chip number and the block number designated by the logical address.

The blocks in the flash memory are sequentially accessed so as to detect the block number of the block that stores data. Also, the logical address allocated to the data is detected, and the detected block number is stored in the entry designated by the logical address in the management table. In this manner, the memory management table is produced.

In a case where a non-volatile memory or a memory backed up by a battery is mounted on a conventional memory card, an initializing process is performed by setting an initial value in each inner register when the memory is started by switching the power on. After that, the memory is accessed so as to produce a memory management table.

When the memory management table is completed, the host device is notified of canceling of a busy state, thereby allowing the host device to issue a process request.

In the prior art, however, when the memory is started, the host device of notified of canceling of the busy state only after the completion of the memory management table. With such a structure, there is a problem that the host device cannot promptly start an operation, because it takes time to complete the memory management table.

This adds to another problem that, if a memory card at an access destination is not promptly started, the host device might wrongly detect an error in the memory card.

DISCLOSURE THE INVENTION

The present invention relates to a method of producing a memory management table for controlling memories having a function to hold data at a time of power cut-off and managing identifier information of memory areas to be data storage destinations designated by a logical address issued from a host device. The principal object of the present invention is to provide a method of producing a memory management table that can shorten the start-up period of time of a memory device and ensure accurate operations of a system, and also to provide a memory device for which the method of producing a memory management table can be performed.

To achieve the above object, the present invention provides a method of producing a memory management table which serves to control one or a plurality of memories having a function to hold data while the power is cut off, and manages identifier information of memory areas which are data storage destinations each indicated by a logical address issued by a host device. This method includes the steps of:

notifying the host device of canceling of a busy state;
starting the production of an incomplete part of the memory management table;
accessing the one or the plurality of memories until a process request is issued from the host device, with the memory areas being units, so as to acquire a logical address held by data stored in an accessed one of the memory areas; and
completing the incomplete part of the memory management table based on the acquired logical address and the identifier information of the accessed one of the memory areas.

By this method of producing a memory management table, the host device can start an operation immediately after the memory device is activated, thereby shortening the start-up time of the memory device.

BRIEF DESCRIPTION OF THE DRAWINGS

The other-objects and features of the present invention will become apparent from the following description, with reference to the accompanying drawings.

FIG. 3 illustrates a memory management table;

FIG. 4 illustrates a memory management table;

FIG. 5 shows a principle structure of the present invention;

FIG. 7 illustrates a data storage management table;

PREFERRED EMBODIMENTS FOR CARRYING OUT THE INVENTION

Figure 1:
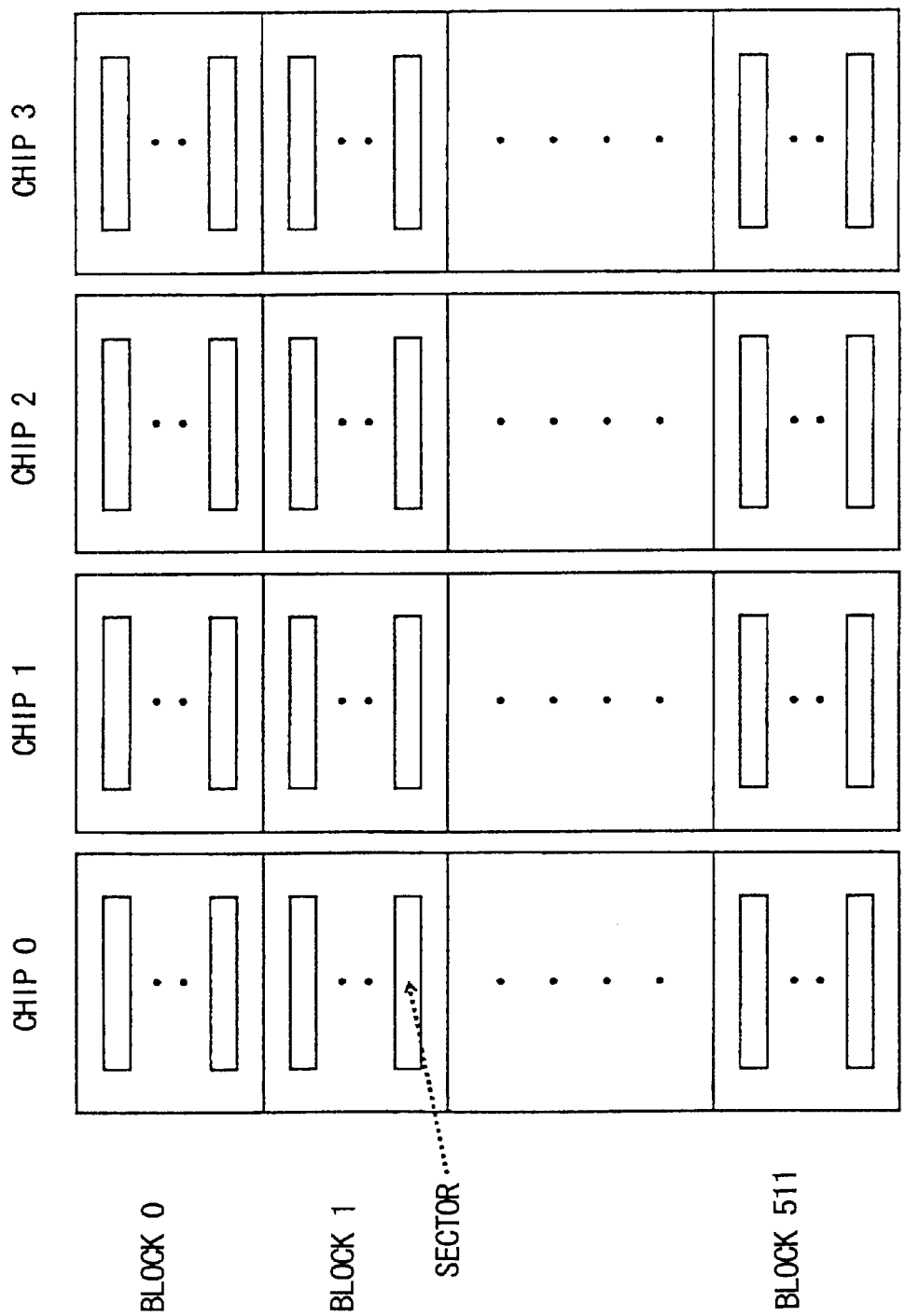
FIG. 1 illustrates a flash memory.

The following is a description of embodiments of the present invention, with reference to the accompanying drawings.

FIG. 5 shows the principle structure of the present invention.

In this figure, reference numeral 1 indicates a memory device that embodies the present invention. This memory device 1 comprises: one or a plurality of memories 10 that have a function to hold data at a time of power cutoff; a CPU 11 that receives a process request issued by a host device 2; a controller 12 that controls the memories 10 by issuing a memory control command in compliance with an instruction of the CPU 11; and a bus 13 that connects the memories 10, the CPU 11, and the controller 12. Reference numeral 2 indicates the host device, which issues the process request to the memory device 1.

Reference numeral 14 indicates a memory management table that is developed by the CPU 11 and manages the identifier information in a memory region that is the data storage destination designated by a logical address issued by the host device 2. Reference numeral 15 indicates a producing unit that operates on the CPU 11 and produces the memory management table 14. Reference numeral 16 indicates a detecting unit that operates on the CPU 11, and determines whether or nor the host device 2 has issued a process request. Reference numeral 17 indicates a notifying unit that notifies the host device 2 of canceling of a busy state.

When the initial setting is complete after the power is switched on, the notifying unit 17 promptly notifies the host device 2 of the canceling of the busy state. The producing unit 15 then starts producing the memory management table 14. Until a process request is issued from the host device 2, the producing unit 15 accesses the memories 10 by the memory region so as to obtain the logical address of the data to be stored in the memory region. In accordance with the obtained logical address and the identifier information in the accessed memory region, the producing unit 15 produces the memory management table 14.

If there is an incomplete part remaining on the memory management table 14, the producing unit 15 ends the process corresponding the process request issued by the host device 2, and notifies the host device 2 of the canceling of the busy state. After that, the producing unit 15 producing the incomplete part of the memory management table 14 before the next process request issuance. When the host device 2 issues the process request, the producing unit 15 can complete the memory management table 14 by accessing one of the memories 10 to which the logical address designated by the process request is allocated.

In the memory device 1 of the present invention, when the initial setting is completed after the power is switched on, the producing unit 15 starts producing a part of the memory management table 14, and accesses the memories 10 by the memory region so as to obtain the logical address of the data to be stored in the memory region. In accordance with the obtained logical address and the identifier information of the accessed memory region, the producing unit 15 produces the part of the memory management table 14. Here, the producing unit 15 imposes a limitation on the number of memory regions to be accessed, thereby determining which part of the memory management table 14 should be produced. Alternatively, the producing unit 15 may impose a limitation on the access time, thereby determining which part of the memory management table 14 should be produced.

When the producing unit 15 produces a part of the memory management table 14, the notifying unit 17 notifies the host device 2 of the canceling of the busy state. Subsequently, the producing unit 15 starts producing the remaining part of the memory management table 14, and accesses the memories 10 by the memory region so as to obtain the logical address allocated to the data to be stored in the memory region until the host device 2 issues a process request. In accordance with the obtained logical address and the identifier information of the accessed memory region, the memory management table 14 is produced.

If there is an incomplete part remaining on the memory management table 14, the producing unit 15 ends the process corresponding to the process request issued by the host device 2, and notifies the host device 2 of the canceling of the busy state. After that, until the next process request is issued, the producing unit 15 produces the incomplete part of the memory management table 14, or, when a process request is issued by the host device 2, the producing unit 15 accesses one of the memories 10 to which the logical address designated by the process request is allocated, completing the incomplete part of the memory management table 14.

Also, when the initial setting is completed after the power is switched on in the memory device 1 of the present invention, the notifying unit 17 promptly notifies the host device 2 of the canceling of the busy state. After that, when the host device 2 issues a process request, the producing unit 15 starts producing an incomplete part of the memory management table 14 by the memory region. By accessing one of the memories 10 to which the logical address designated by the process request is allocated, the producing unit 15 obtains the logical address allocated to the date to be stored in the accessed memory region. In accordance with the obtained logical address and the identifier information of the accessed memory region, the producing unit 15 produces the incomplete part of the memory management table 14.

The producing unit 15 interrupts the production of the incomplete part of the memory management table 14, when the producing unit 15 ends the access to all the memory regions held by one of the memories 10 to which the logical address designated by the process request is allocated. The producing unit 15 also interrupts the production of the incomplete part of the memory management table 14, when the access to a memory region having the logical address designated by the process request is detected. The producing nit 15 also interrupts the production of the incomplete part of the memory management table 14, after the access to a memory region having the logical address designated by the process request is detected. The producing unit 15 also interrupts the production of the incomplete part of the memory management table 14 by imposing a limitation on the number of memory regions to be accessed. The producing unit 15 also interrupts the production of the incomplete part of the memory management table 14 by imposing a limitation on the access time after the access to a memory region having the logical address designated by the process request is detected.

When the initial setting is complete after the power is switched on in the memory device 1 of the present invention, the producing unit 15 starts producing a part of the memory management table 14, and accesses the memories 10 by the memory region, so as to obtain the logical address held by the data to be stored in the memory region. Based on the obtained logical address and the identifier information of the accessed memory region, the producing unit 15 produces the part of the memory management table 14. Here, the producing unit 15 imposes a limitation on the number of memory regions to be accessed, thereby deciding which part of the memory management table 14 should be produced. The producing unit 15 also imposes a limitation on the access time, thereby deciding which part of the memory management table 14 should be produced.

When the producing unit 15 starts producing a part of the memory management table 14, the notifying unit 17 notifies the host device 2 of canceling of the busy state. After that, as the host device 2 issues a process request, the producing unit 15 starts producing an incomplete part of the memory management table 14, and accesses one of the memories 10 to which the logical address designated by the process request is allocated by the memory region, thereby obtaining the logical address held by data to be stored in the memory regions. Based on the obtained logical address and the identifier information of the accessed memory regions, the producing unit 15 produces the incomplete part of the memory management table 14.

Here, the producing unit 15 interrupts the production of the incomplete part of the memory management table 14, when the access to the all the memory regions held by the memory 10 to which the logical address designated by the process request is allocated is terminated. The producing unit 15 also interrupts the production of the incomplete part of the memory management table 14, when the access to the memory regions having the logical address designated by the process request is detected. The producing unit 15 also interrupts the production of the incomplete part of the memory management table 14, when the access to a memory region having the logical address designated by the process request is detected, and a limitation is then imposed on the number of memory regions to be accessed. The producing unit 15 also interrupts the production of the incomplete part of the memory management table 14, when the access to a memory region having the logical address designated by the process request is detected, and a limitation is then imposed on the access time.

In the prior art, after the initial setting, the memory management table 14 is completed, and the host device 2 is notified of the cancellation of the busy state. In the memory device 1 of the present invention, on the contrary, the host device 2 is promptly notified of the cancellation of the busy state, without the production of the memory management table 14. Also, the host device 2 may be notified of the cancellation only after a part of the memory management table 14 has been completed, and the incomplete part of the memory management table 14 is then produced until the host device 2 issues a process request. Alternatively, when the host device 2 issues a process request, the incomplete part of the memory management table 14 corresponding to the logical address designated by the process request may be produced. With such a structure, the host device 2 can start an operation immediately after the memory device 1 is activated.

In the above manner, the host device 2 can promptly confirm that the memory device 1 is working properly. Thus, the host device 2 can immediately starts an operation without wrongly detecting an error in the memory device 1.

Figure 6:
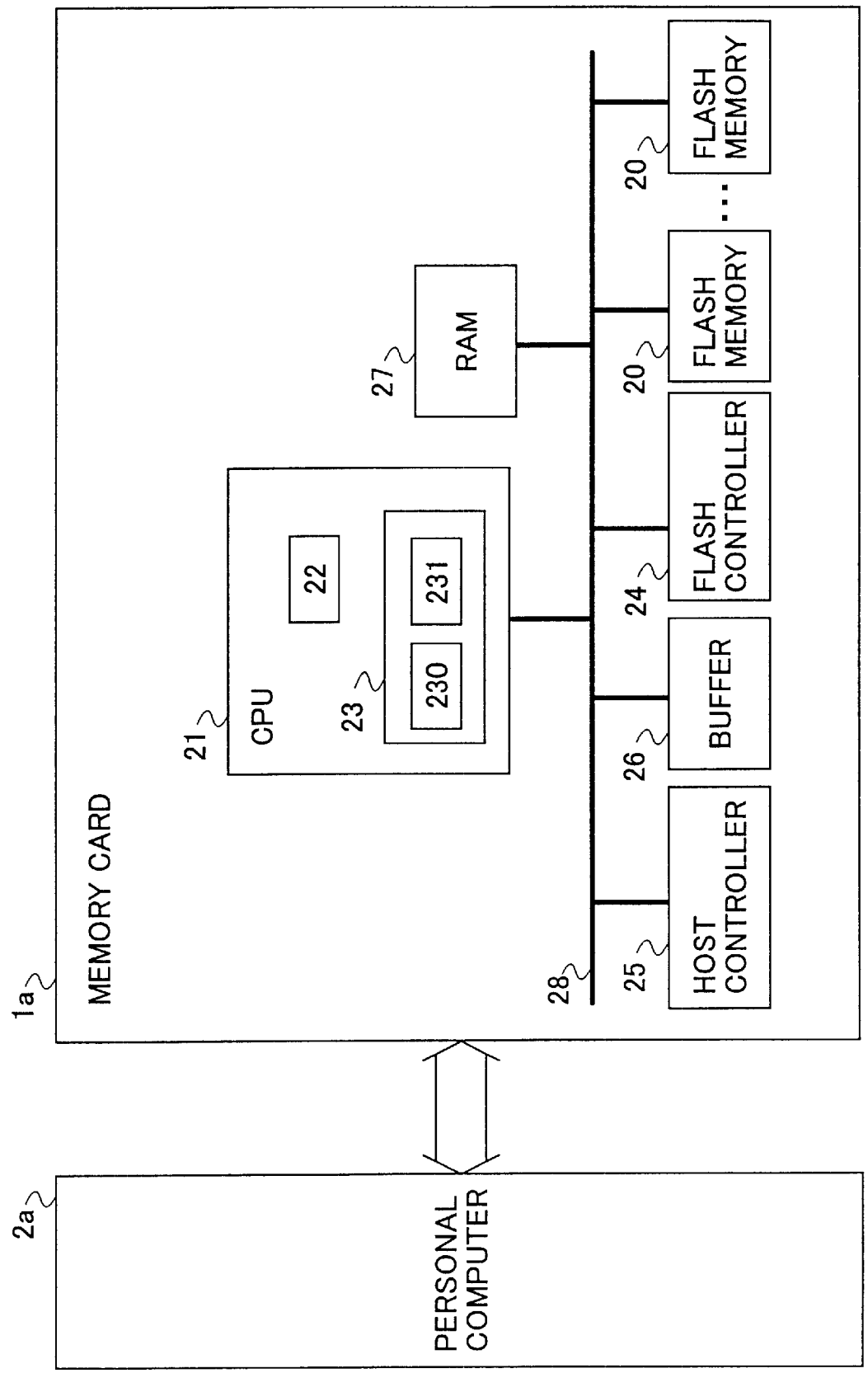
FIG. 6 illustrates a memory card.

FIG. 6 shows a memory card 1a to which the present invention is applied.

This memory card 1a is detachably inserted into a slot formed in a personal computer 2a, and equipped with one or a plurality of flash memories 20. In response to an access request issued by the personal computer 2a, the memory card 1a makes an access to the flash memories 20. In order to realize the access, the memory card 1a further comprises a ROM 22, a CPU 21 having a SRAM region 23, a flash controller 24, a host controller 25, a buffer 26, a RAM 27, and a common bus 28 for connecting these components.

The ROM 22 stores a program for realizing the access to the flash memories 20. When the personal computer 2a issues an access request, the CPU 21 issues an access instruction to the flash controller 24 in accordance with the program, thereby making an access to the flash memories 20.

More specifically, a first flash memory 20 stores structure information such as the number of mounted flash memories 20. Therefore, at the time of activation of the memory card 1a, in accordance with the program stored in the ROM 22, the CPU 21 reads out the memory capacity per chip of the flash memories 20 and the structure information of the flash memories 20, thereby detecting the entire memory capacity. The CPU 21 then notifies the personal computer 2a of the detected entire memory capacity. When the personal computer 2a issues an access request designating an address during a normal operation, the CPU 21 determines, from the memory capacity per chip, the chip number of the flash memory 20 to be the access destination, in accordance with the program stored in the ROM 22. The CPU 21 then enables the flash memory 20 corresponding to the chip number, and issues an access instruction to the flash controller 24, thereby making an access to the flash memory 20.

When the CPU 21 issues an access instruction to the flash memories 20, the flash controller 24 issues a command to the flash memories 20, thereby making an access to the flash memories 20. The host controller 25 performs an interface process between the personal computer 2a and the memory card 1a. The buffer 26 stores data to be written in the flash memories 20 and data read out from the flash memories 20. The RAM 27 serves as a work memory for the CPU 21.

In the SRAM region 23 in the CPU 21, a memory management table 230 having the data structure shown in FIG. 3 (equivalent to the memory management table 14 shown in FIG. 5) is developed, and a data storage management table 231 having a data structure shown in FIG. 7 which manages whether or not each block in the flash memories 20 stores data is developed.

Figure 2:
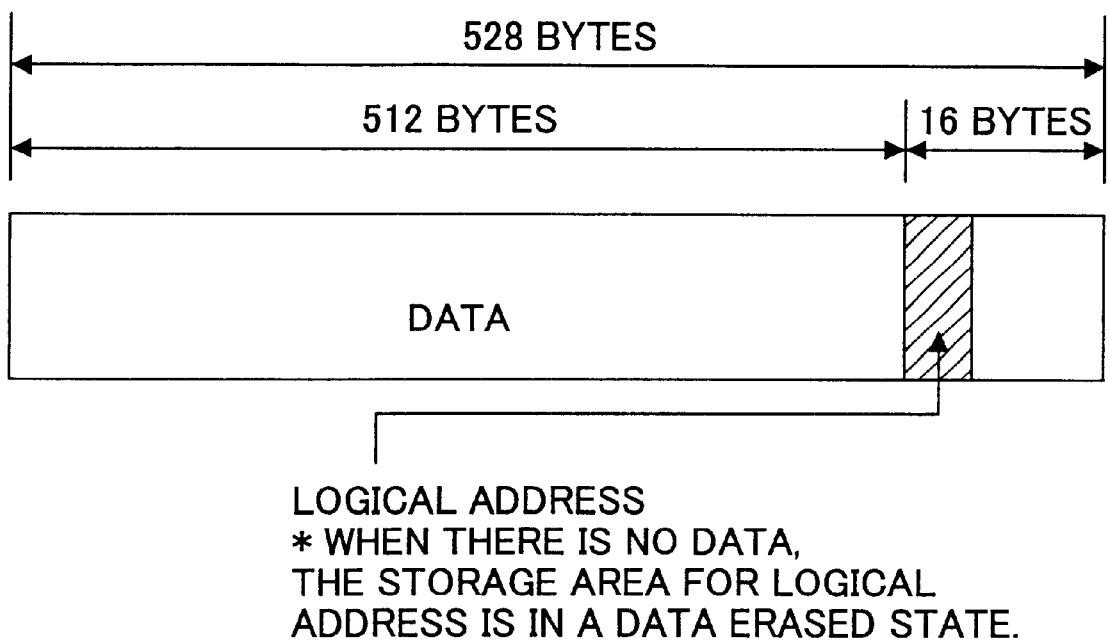
FIG. 2 illustrates a flash memory.

For ease of explanation, each flash memory 20 has the same structure as shown in FIGS. 1 and 2, and the memory management table 230 has the same structure as that shown in FIG. 3.

Each of the flash memories 20 contained in the memory card 1a is divided into 512 blocks that constitute one unit for erasing data, and each of the blocks has 8 sectors that constitute one unit for storing data, as shown in FIG. 3. Each of the sectors has a 528-byte area, and stores 512-byte data and a logical address allocated to the data, as shown in FIG. 2.

In the memory management table 230 developed in the SRAM region 23, the part corresponding to the flash memory of the chip number "0" manages the storage destination block number of the logical address "0", the storage destination block number of the logical address "4" . . . , the part corresponding to the flash memory of the chip number "1" manages the storage destination block number of the logical address "1", the storage destination block number of the logical address "5" . . . , the part corresponding to the flash memory of the chip number "2" manages the storage destination block number of the logical address "2", the storage destination block number of the logical address "6" . . ., and the part corresponding to the flash memory of the chip number "3" manages the storage destination block number of the logical address "3", the storage destination block number of the logical address "7" . . . , as shown in FIG. 3.

Figure 8:
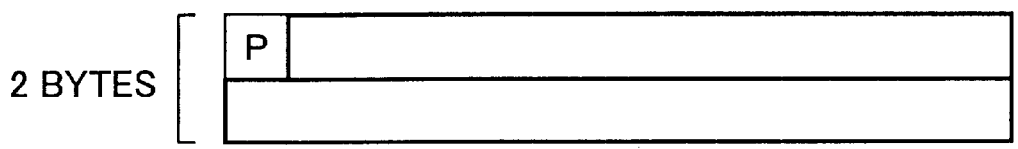
FIG. 8 illustrates a memory management table.

The management data stored in the memory management table 230 has a 2-byte area, as shown in FIG. 8. The 2-byte area stores a block number constituted by 15 bits, and the most significant bit (hereinafter referred to as "p-bit") that displays "1" when the block number entry is vacant, and displays "0" when the block umber entry is occupied or incomplete.

In a case where the p bit is "0" and the entry is occupied, a regular block number is registered in the entry. In a case where the p bit is "0" and the entry is incomplete, an irregular block number which cannot be in the entry is registered. The memory management table 230 is initialized to an incomplete state when the power to the memory card 1a is switched on.

As already mentioned with reference to FIG. 5, according to the present invention, the personal computer 2a is promptly notified of the canceling of the busy state, without the production of the memory management table 230, unlike the prior art in which the personal computer 2a is notified of the canceling of the busy state after the completion of the memory management table 230. Also, according to the present invention, after a part of the memory management table 230 is produced, and the personal computer 2a is then notified of the busy state, followed by the production of the remaining incomplete part of the memory management table 230.

The production of the incomplete part of the memory management table 230 is carried out while the personal computer 2a is not issuing a process request. Alternatively, the production of the incomplete part of the memory management table 230 is carried out in synchronization with the timing of issuance of an access request by the personal computer 2a.

Before describing the total production process of the memory management table 230, the production process of an incomplete part of the memory management table 230 will be described, with reference to the flowcharts of FIGS. 9 to 11.

When an incomplete part of the memory management table 230 is produced, an initializing process is performed to notice the personal computer 2a of the canceling of the busy state, and, in response to a process request from the personal compute 2a, a requested process is carried out. At the time of the end of the process, the CPU 21 notifies the personal computer 2a of the canceling of the busy state, and, in accordance with the program stored in the ROM 22, the CPU 21 selects one of the blocks in the unprocessed flash memories 20 in the regular order in step 1, as shown in FIG. 9. For instance, in accordance with the order starting from the flash memory 20 having the smallest chip number, the CPU 21 selects one of unprocessed blocks in the order starting from the top block.

In step 2, the logical address stored in the selected block is acquired (However, it should be noted that if there is no data, there is no logical address written in the block.), and the block number of the selected block is written in the entry designated by the logical address in the memory management table 230. Also, the data "0" for indicating that the block is occupied is written in the p bit (however, no actual writing process is performed on the p bit, because the initial value "0" is already written). In this manner, the entry of the memory management table 230 is produced.

In step 3, it is determined whether or not all the blocks in one flash memory 20 have been selected. If it is determined that all the blocks have been selected, the operation moves on to step 4. In step 4, the data "1" for indicating vacancy is written in the p bit of an entry designated by a logical address which is not written in the above flash memory 20.

On the other hand, if it is determined that not all the blocks in the flash memory 20 have been selected, the process of step 4 is skipped.

In step 5, it is determined whether or not all the blocks in all the flash memories 20 have been selected. If it is determined that all the blocks have been selected, the operation comes to an end. If it is determined that not all the blocks have been selected, the operation moves on to step 6. In step 6, it is determined whether or not a process request has been issued from the personal computer 2a. If it is determined that no process request has been issued, the operation returns to step 1, and the table producing operation is continued. If it is determined that a process request has been issued, how much progress has been made in the table producing operation is recorded for the later reference.

Figure 9:
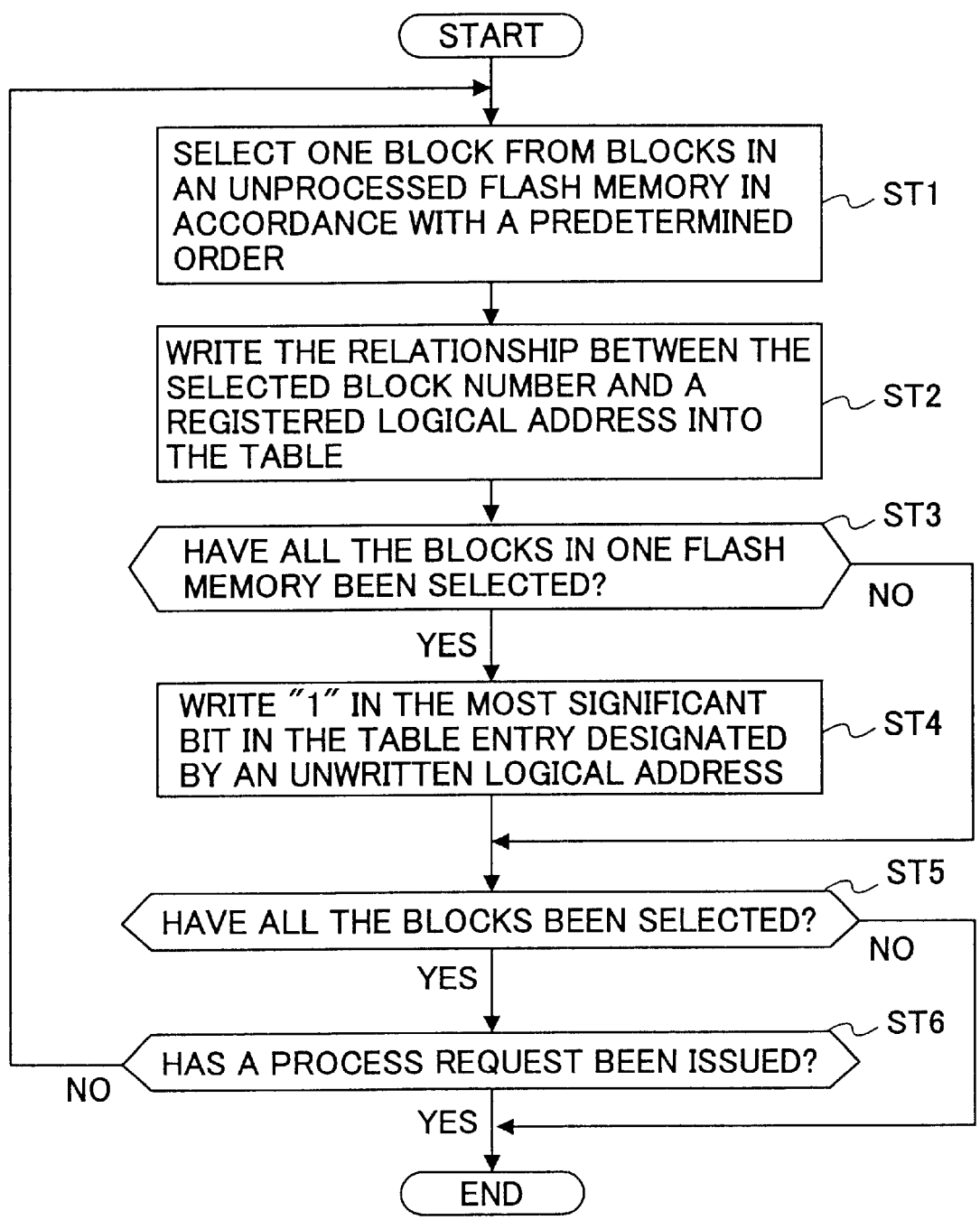
FIG. 9 is a flowchart of a process of producing the memory management table.

In the above manner, the CPU 21 carries out the processes shown in FIG. 9, thereby producing incomplete parts of the memory management table 230 while no process request is being issued from the personal computer 2a.

In another embodiment, during a producing process of an incomplete part of the memory management table 230, the personal computer 2a issues an access request (which is a process request for an access to the flash memories 20, and designates a logical address). In step 11, in accordance with the program stored in the ROM 22, the CPU 21 reads out management data (a block number/p bit) from the memory management table 230 to which the logical address designated by the access request is allocated, as shown in FIGS. 10 and 11. For instance, when a logical address "8" is issued, the CPU 21 reads out the management data stored in the entry specified by the chip number "0" and line "2", in accordance with the memory management table 230 shown in FIG. 3.

In step 12, it is determined whether or not the p bit of the read management data is "1". If it is determined that the p bit is "1", i.e., if it is determined that the entry in the memory management table 230 designated by the issued logical address is vacant, the operation moves on to step 13. In step 13, it is determined whether or not a write command has been issued by the access request.

If it is determined from the judgment result that a write command has been issued, the operation moves on to step 14. In step 14, a vacant block in the flash memory 20 to which the issued logical address is allocated is searched for, with reference to the data storage management table 231, and write data is written in the vacant block. For instance, when the logical address "8" is issued, a vacant block in the flash memory 20 of the chip number "0" is searched for, and write data is written in the vacant block. In step 15, the block number of the data storage destination is written in the entry designated by the issued logical address in the memory management table 230, and the data "0" for indicating the occupation of the entry is written in the p bit. The operation then comes to an end.

Meanwhile, if it is determined from the judgment result of step 13 that the issued command is not a write command, the operation moves on to step 16. In step 16, a process corresponding to the issued command is performed. If it is determined, prior to step 16, that the issued command is a read command, a code indicating that there is no data is transferred to the personal computer 2a. If the issued command is an erase command, a code indicating the end of the process is transferred to the personal computer 2a, because data has already been erased.

Meanwhile, if it is determined in step 12 that the p bit does not indicate "1", i.e., if the entry designated by the issued logical address in the memory management table 230 is in use or unprocessed, the operation moves on to step 17. In step 17, it is determined whether or not a regular block number is registered in the designated entry.

It is determined from the judgment result that a regular block number has been registered in the entry designated by the issued logical address in the memory management table 230, i.e., if the entry designated by the issue logical address is being used, the operation returns to step 3. Since the flash memories 20 cannot be rewritten, a vacant block is searched for in the flash memory 20 to which the issued logical address is allocated when a write command is issued. When the write data is written in the vacant block and the previous data is erased.

In this case, since the p bit is already "0", no writing process is performed to put "0" in the p bit in step 15. Furthermore, in step 16, when a read command is issued, the data designated by the block number acquired in step 17 is read out from the flash memory 20 to which the issued logical address is allocated. The read data is then transferred to the personal computer 2a. On the other hand, when an erase command is issued, the data is erased, and "1" is written in the p bit.

Meanwhile, if it is determined from the judgment result of step 17 that no regular block number has been registered in the entry designated by the issued logical address in the memory management table 230, i.e., if it is determined that the entry designated by the issued logical address is incomplete, the operation moves on to step 18. In step 18, one of the blocks in the flash memory 20 to which the issued logical address is allocated is selected in the predetermined order (from the top block, for instance).

In step 19, it is determined whether or not a block has been selected through the selecting process of step 18. If it is determined that a block has been selected, the operation moves on to step 20. In step 20, the logical addresses stored in the selected block is acquired (however, if there is no data, no logical addresses are stored in the block), and the block number of the selected block is written in the entry designated by the logical address in the memory management table 230. At the same time, "0" for indicating that the block is being used is written in the p bit (however, an actual writing process is not performed on the p bit, because "0" for indicating incompletion has already been written as the initial value), thereby completing the entry in the memory management table 230. The operation then returns to step 18.

Meanwhile, in step 19, if it is determined that no block cannot be selected through the selecting process of step 18, i.e., if it is determined that all the blocks in the flash memory to which the issued logical address is allocated have been selected, the operation moves on to step 21. In step 21, "1" for indicating vacancy is written in the p bit of an entry designated by a logical address that is not written in the flash memory 20.

In step 22, it is determined whether or not the logical addresses acquired in step 20 include the issued address. If it is determined that the issued address is included, the operation returns to step 13, and the above processes are repeated. Here, a regular block number is stored in the entry designated by the issued logical address in the memory management table 230. Therefore, the processes to be repeated from step 13 are the same as the processes starting from step 13 after going through the process of step 17.

Meanwhile, if it is determined that the issued logical address is not included in the logical addresses acquired in step 20, the operation returns to step 13, and the aforementioned processes are repeated. Here, since the entry designated by the issued logical address in the memory management table 230 is vacant, the processes to be repeated from step 13 are the same as the processes starting from step 13 after going through the process of step 12.

Figure 10:
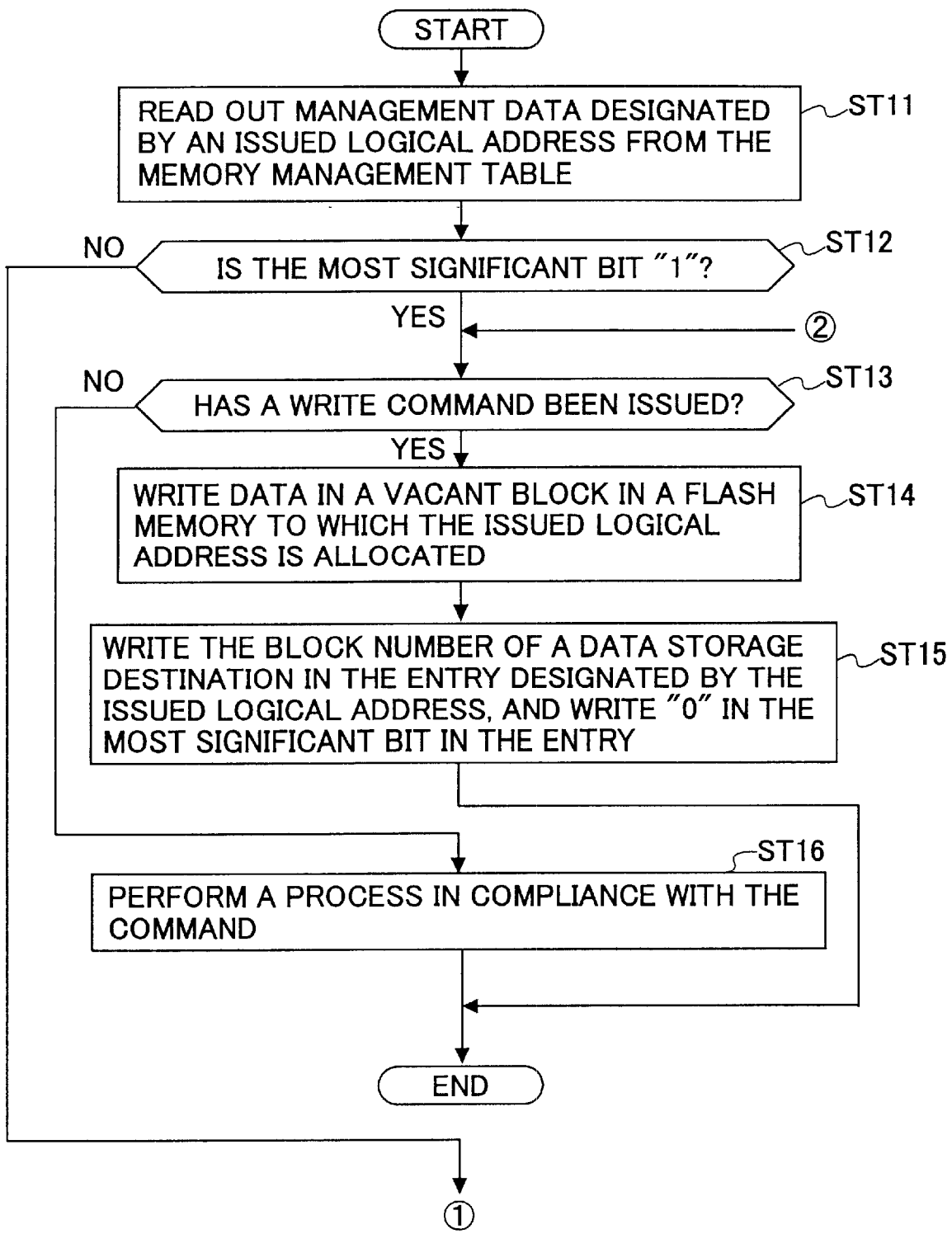
FIG. 10 is a flowchart of a process of producing the memory management table.
Figure 11:
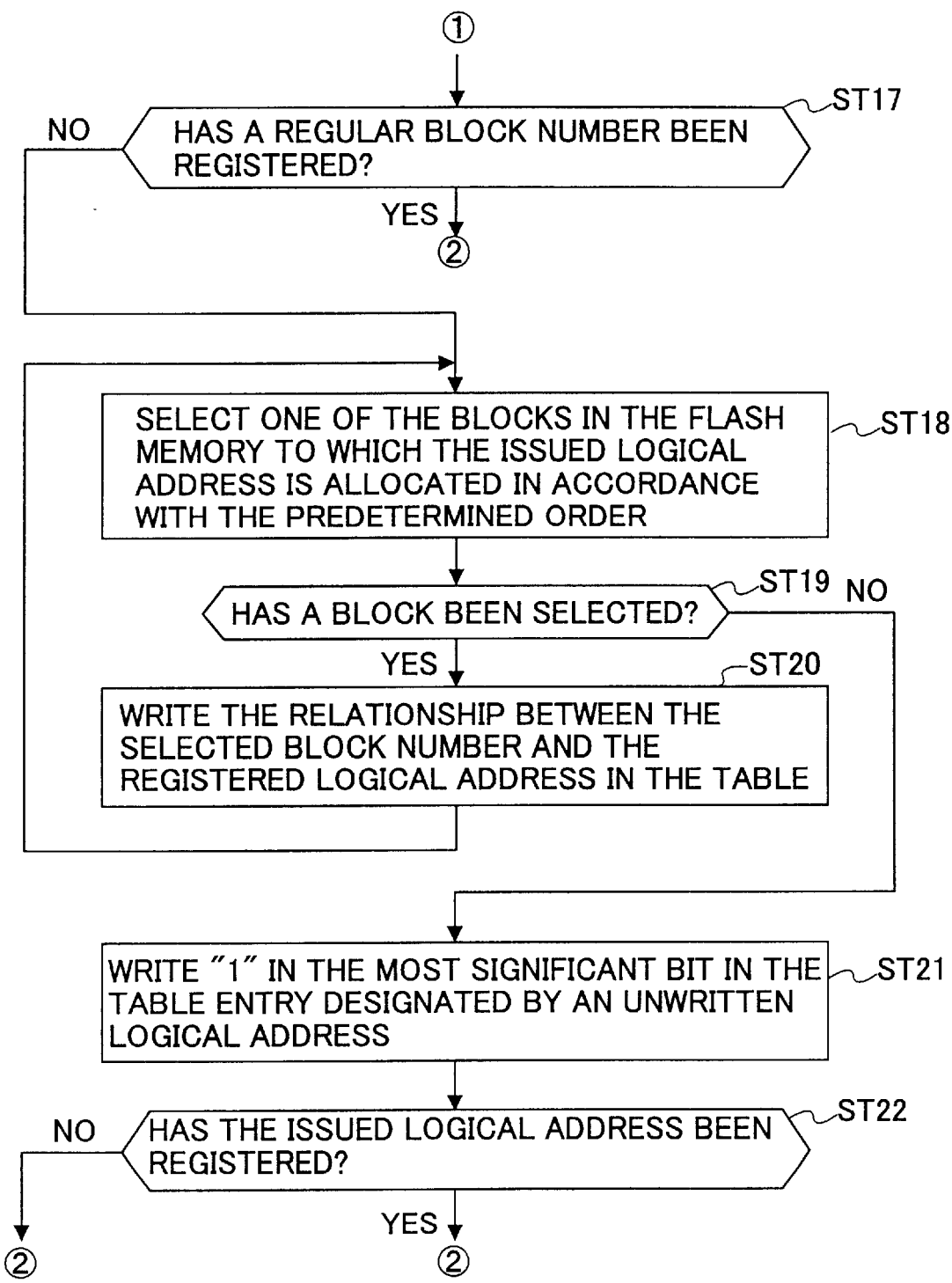
FIG. 11 is a flowchart of a process of producing the memory management table.

In this manner, the CPU 21 performs the processes shown in FIGS. 10 and 11. When the personal computer 2a issues an access request, the CPU 21 produces the incomplete part of the memory management table 230 using the logical address designated by the access request.

In the flowchart of FIGS. 10 and 11, when the personal computer 2a issues an access request and the entry designated by the access request in the memory management table 230 is incomplete, all the blocks in the flash memory 20 to which the logical address is allocated are searched, thereby producing the memory management table 230. However, by performing the processes shown in the flowchart of FIG. 12 instead of the flowchart of FIG. 11, it is also possible to terminate the search and interrupt the production of the memory management table 230 at the point where the data having the logical address is detected.

Figure 12:
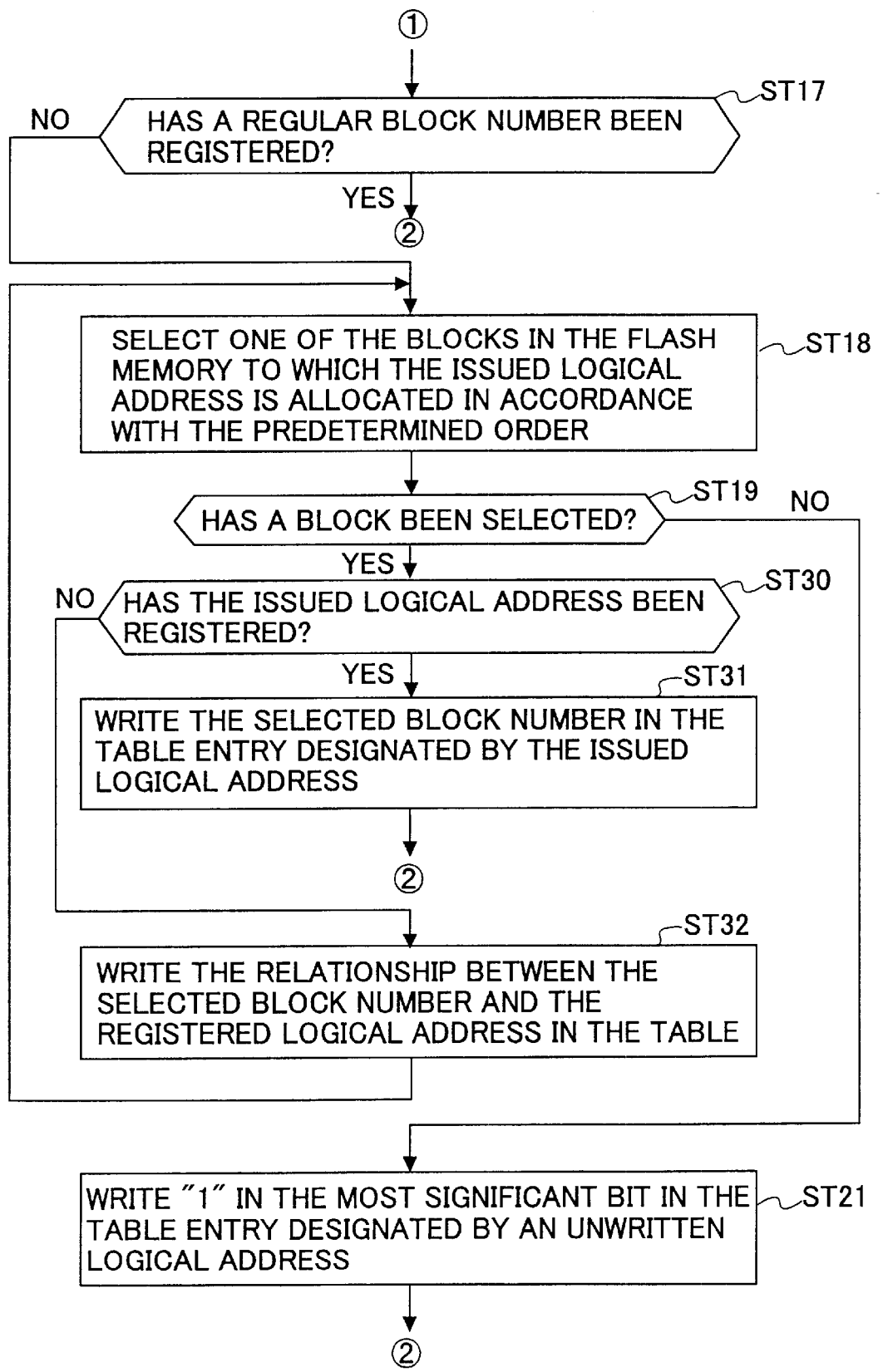
FIG. 12 is a flowchart of a process of producing the memory management table.

In FIG. 12, if it is determined in step 19 that a block has been selected, the operation moves on to step 30. In step 30, it is determined whether or not the issued logical address is registered. If it is determined that the issued logical address is registered, the operation move on to step 31. In step 31, the selected block number is written in the entry designated by the issued logical address, and the operation return to step 13. After returning to step 13, the aforementioned processes are repeated. Meanwhile, if it is determined that the issued logical address is not registered, the operation moves on to step 32. In step 32, the logical address stored in the selected block is written in the entry designated by the logical address in the memory management table 230. At the same time, "0" for indicating the block is occupied, thereby producing the entry part of the table. The operation then returns to step 18.

Figure 13A:
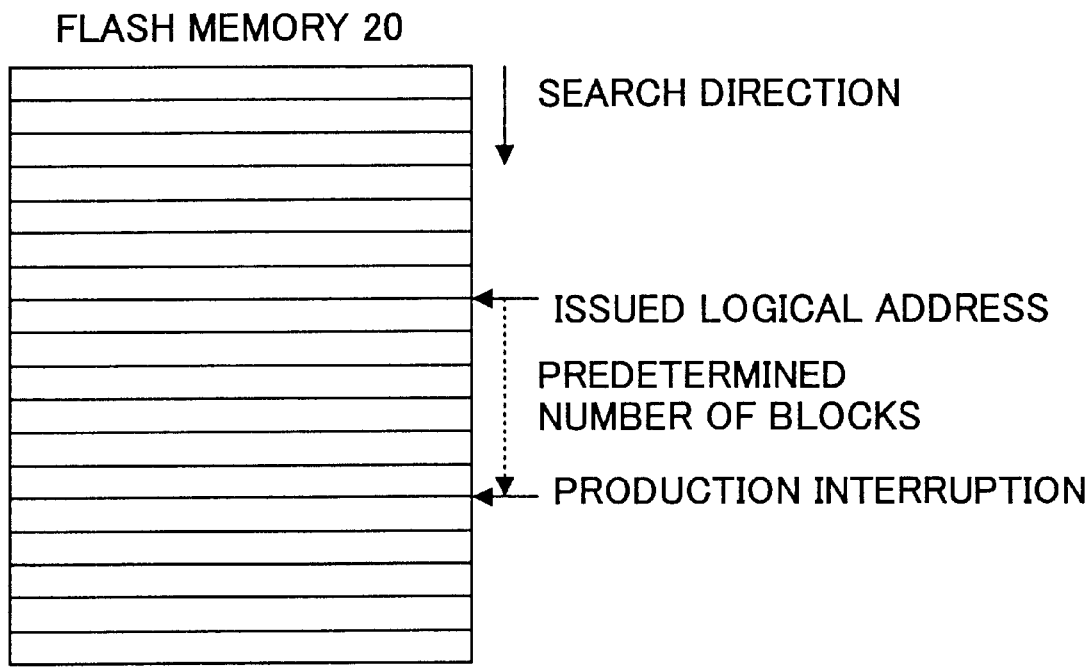
FIGS. 13A and 13B illustrate a process of interrupting the production of the memory management table.
Figure 13B:
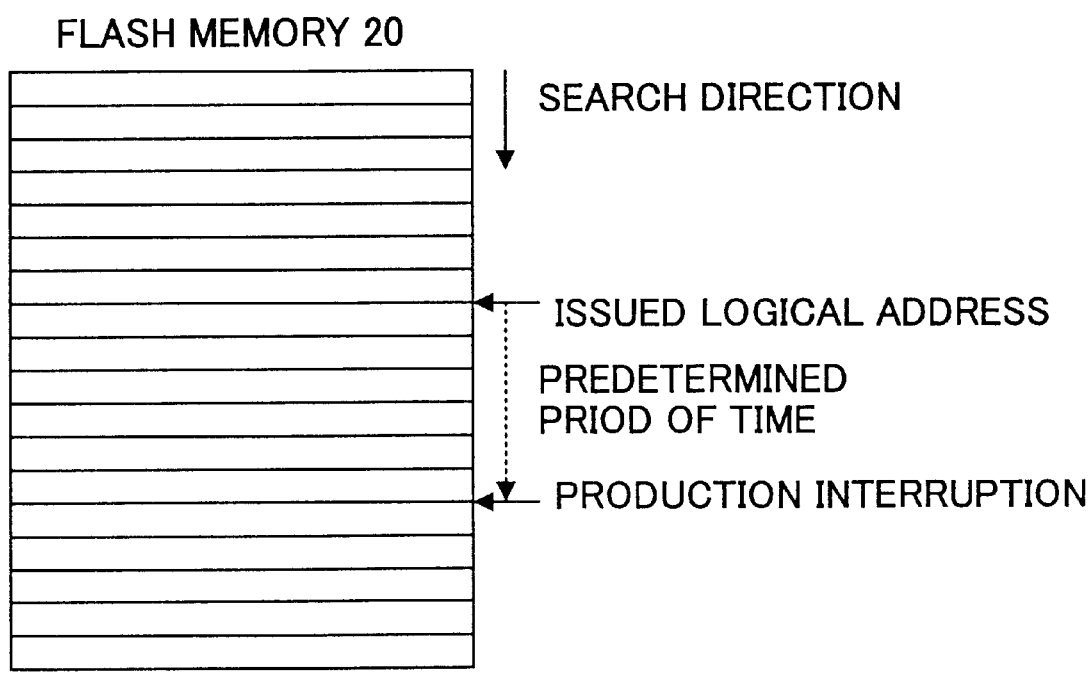

Furthermore, as shown in FIG. 13A, a predetermined number of blocks may be searched, starting from the point where the data having the logical address is detected. When the search ends, the production of the memory management table 230 is terminated. Also, as shown in FIG. 13B, from the point where the data having the logical address is detected, the search may be continued only for a predetermined period of time. When the search ends, it is possible to interrupt the production of the memory management table 230.

Here, if the entry in the memory management table 230 designated by the logical address specified by the access request is incomplete, all the blocks in the flash memory 20 to which the logical address is allocated. This method is advantageous in that the flash memory 20 does not need to be searched again. On the other hand, if the entry in the memory management table 230 designated by the logical address specified by the access request is incomplete, the search of the blocks may be terminated at the point where the data having the logical address is detected. This method is advantageous in that a quick response can be made to the access request.

Next, an embodiment of production processes of the entire memory management table 230 will be described.

Figure 14:
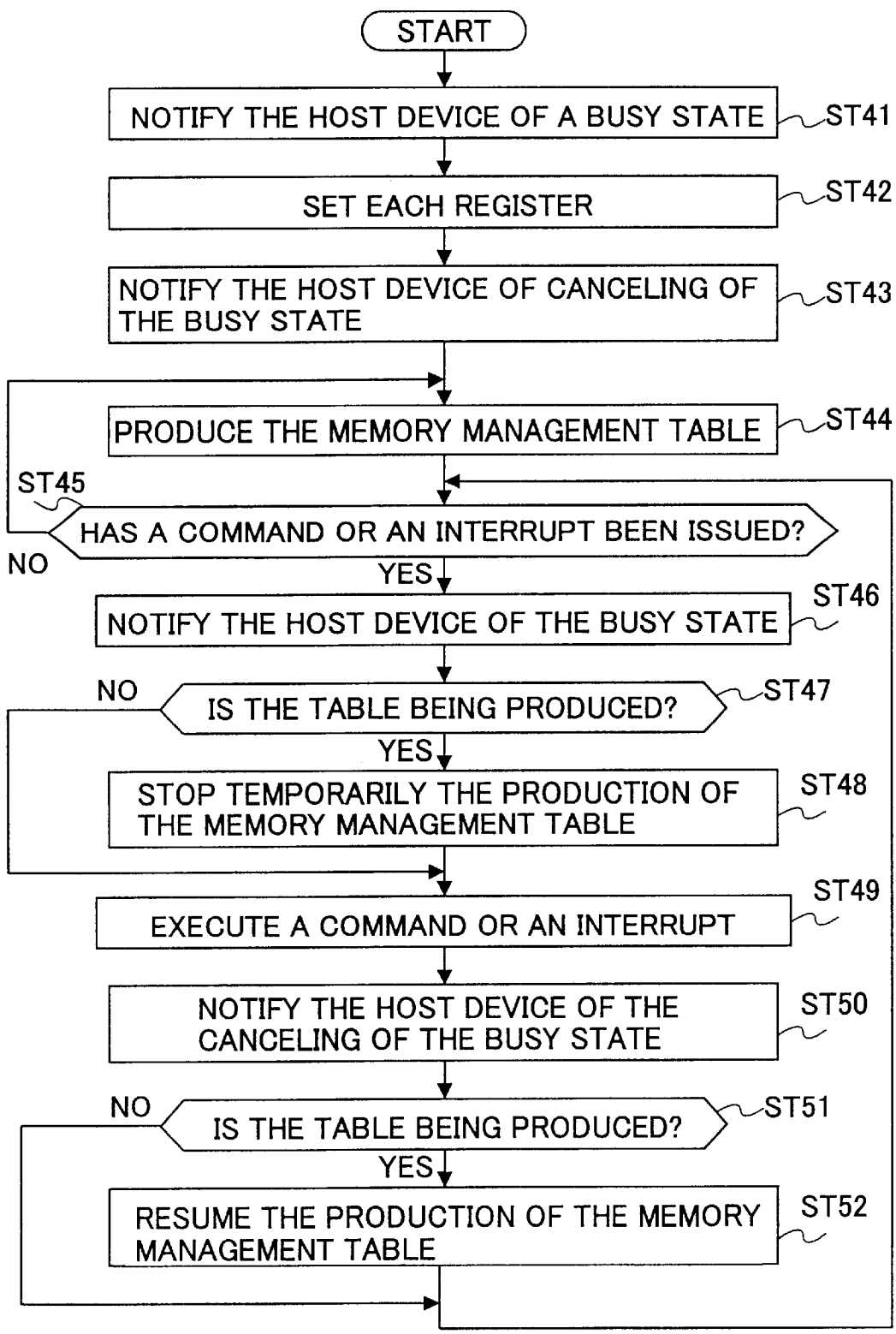
FIG. 14 is a flowchart of a process of producing the memory management table.

FIG. 14 is a flowchart of the production processes of the memory management table 230.

Figure 15:
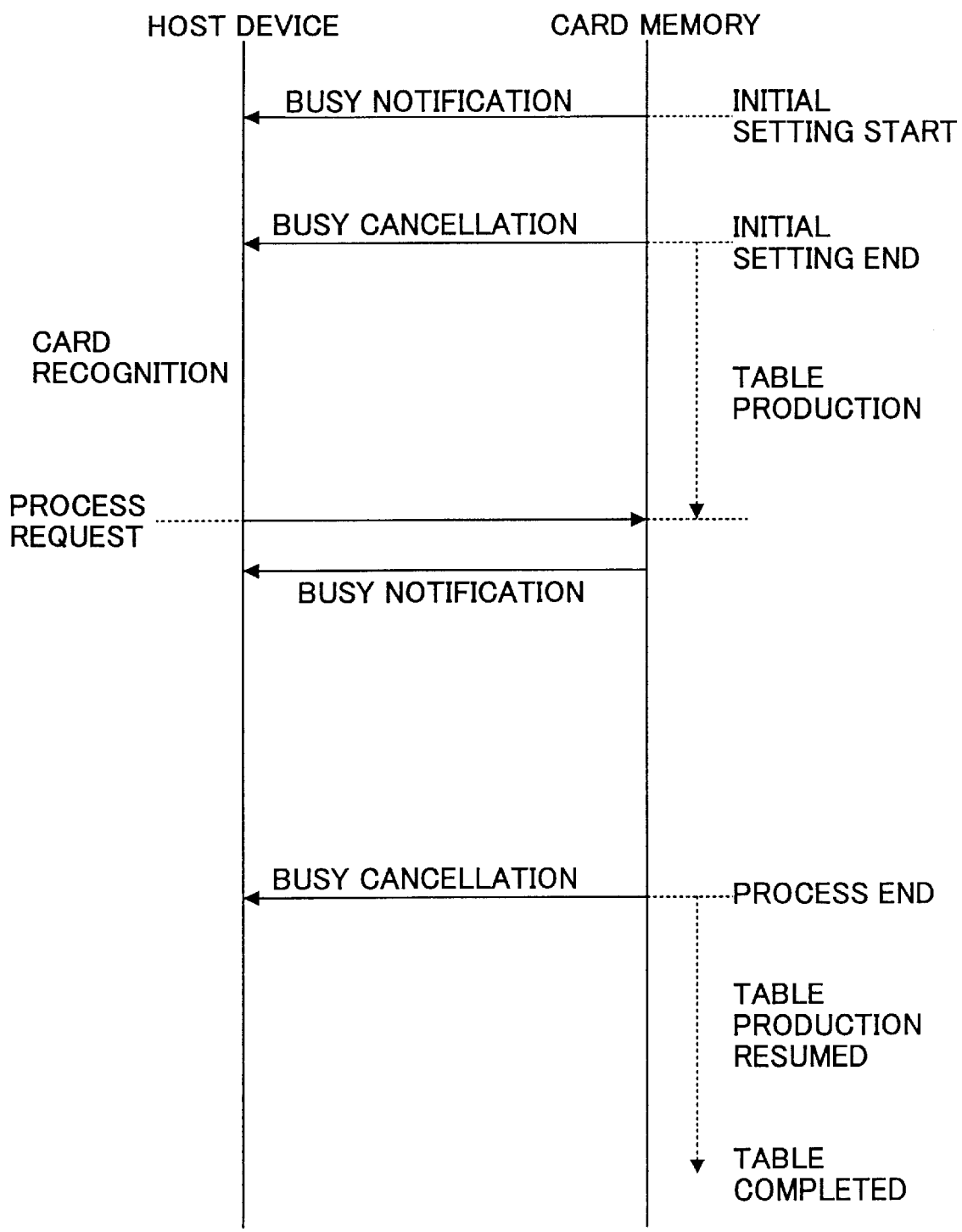
FIG. 15 illustrates a process of producing the memory management table.

In the production processes of this embodiment, as shown in FIG. 15, the personal computer 2a is notified of the canceling of the busy state immediately after the initial setting, and the production of the memory management table 230 is promptly started. When the personal computer 2a issues a process request that is necessary for starting, the production is temporarily stopped, and a process corresponding to the process request is performed. The personal computer 2a is then notified of the canceling of the busy state. If the memory management table 230 is still incomplete at this point, the production of the memory management table 230 is continued until the personal computer 2a issues a next process request. In this manner memory management table 230 can be completed.

More specifically, the CPU 21 is started by switching on the memory card 1a. In accordance with the program stored in the ROM22, the CPU 21 notifies the personal computer 2a of the busy state in step 41. In step 42 an initial value is set in each of the inside registers. After the initialization, the CPU 21 notifies the personal computer 2a of the canceling of the busy state in step 43.

In step 44, the production of the memory management table 230 is started, and the data stored in the flash memories 20 are accessed so as to produce the memory management table 230, as explained with reference to the flowchart of FIG. 9. In step 45, the production of the memory management table 230 is continued until the personal computer 2a issues a command or an interrupt.

If a command or an interrupt issued by the personal computer 2a is detected in step 45 (at this point, a process request relates to the start-up process, instead of an access request using the memory management table 230), the operation moves on to step 46. In step 46, the personal computer 2a is notified of the busy state. In step 47, it is determined whether or not the memory management table 230 is being produced. If it is determined that the memory management table 230 is being produced, the operation moves on to step 48. In step 48, the production of the memory management table 230 is temporarily stopped.

In step 49, a process corresponding to a command or an interrupt issued by the personal computer 2a is performed. After the process is completed, the personal computer 2a is notified of the canceling of the busy state in step 50. In step 51, it is determines whether or not the memory management table 230 is being produced. If it is determined that the memory management table 230 is not being produced, the operation promptly returns to step 45. If it is determined that the memory management table 230 is being produced, the operation moves on to step 52. In step 52, the production of the memory management tale 230 is resumed, and the operation then returns to step 45.

In the above manner as shown in the flowchart of FIG. 14, after the initial setting, the personal computer 2a is promptly notified of the canceling of the busy state, without the production of the memory management table 230. After that, the production of the memory management table 230 is carried out while no process request is issued from the personal computer 2a.

Figure 16:
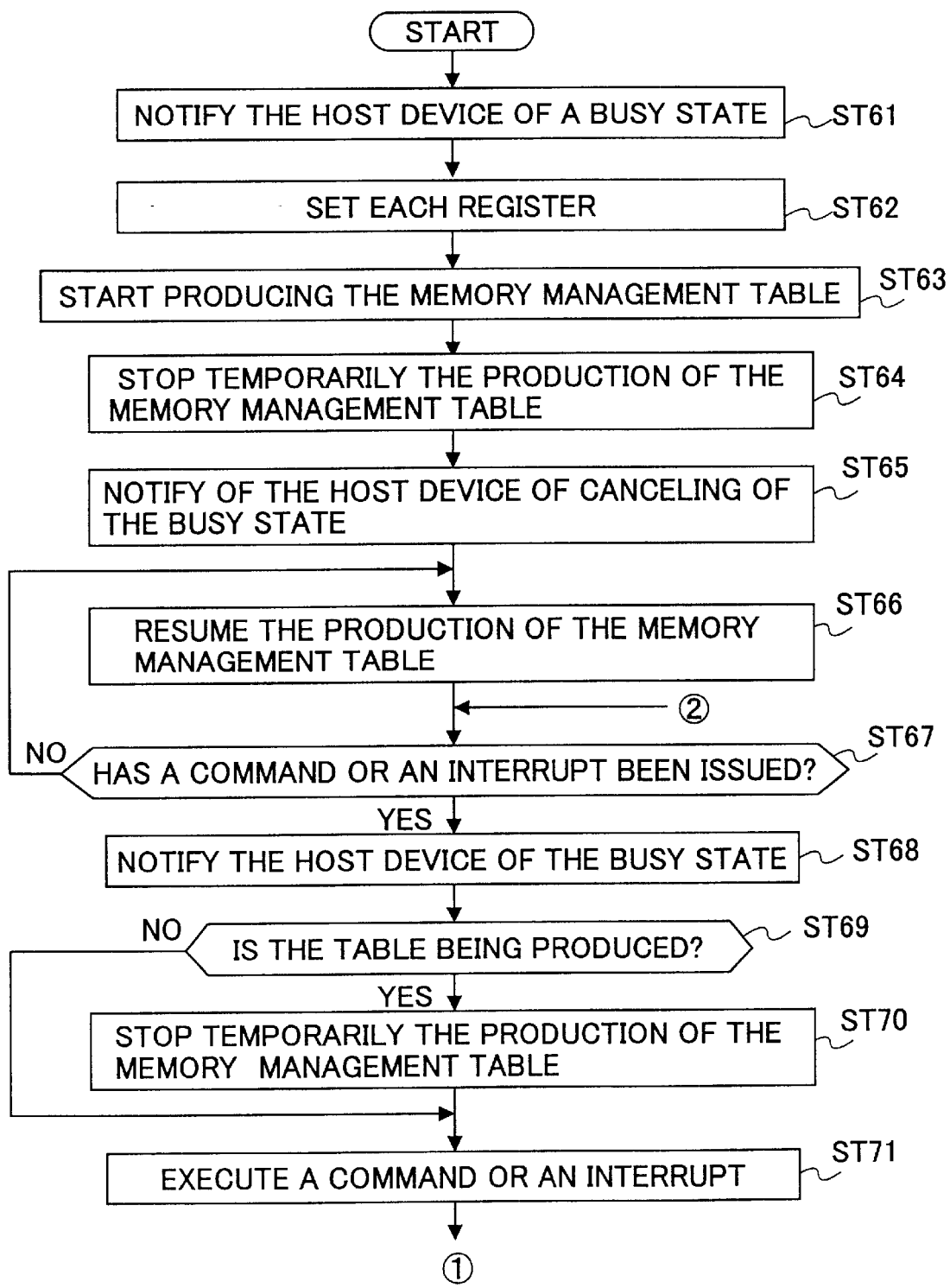
FIG. 16 is a flowchart of a process of producing the memory management table.
Figure 17:
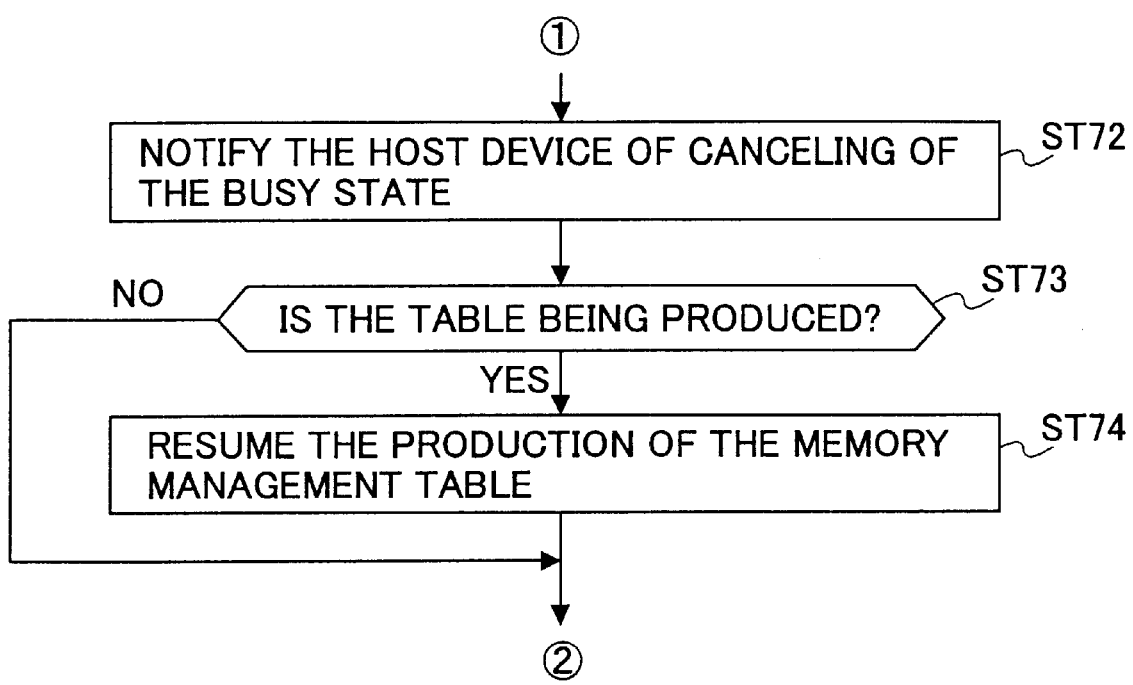
FIG. 17 is a flowchart of a process of producing the memory management table.

FIGS. 16 and 17 show another embodiment of the production processes of the memory management table 230.

Figure 18:
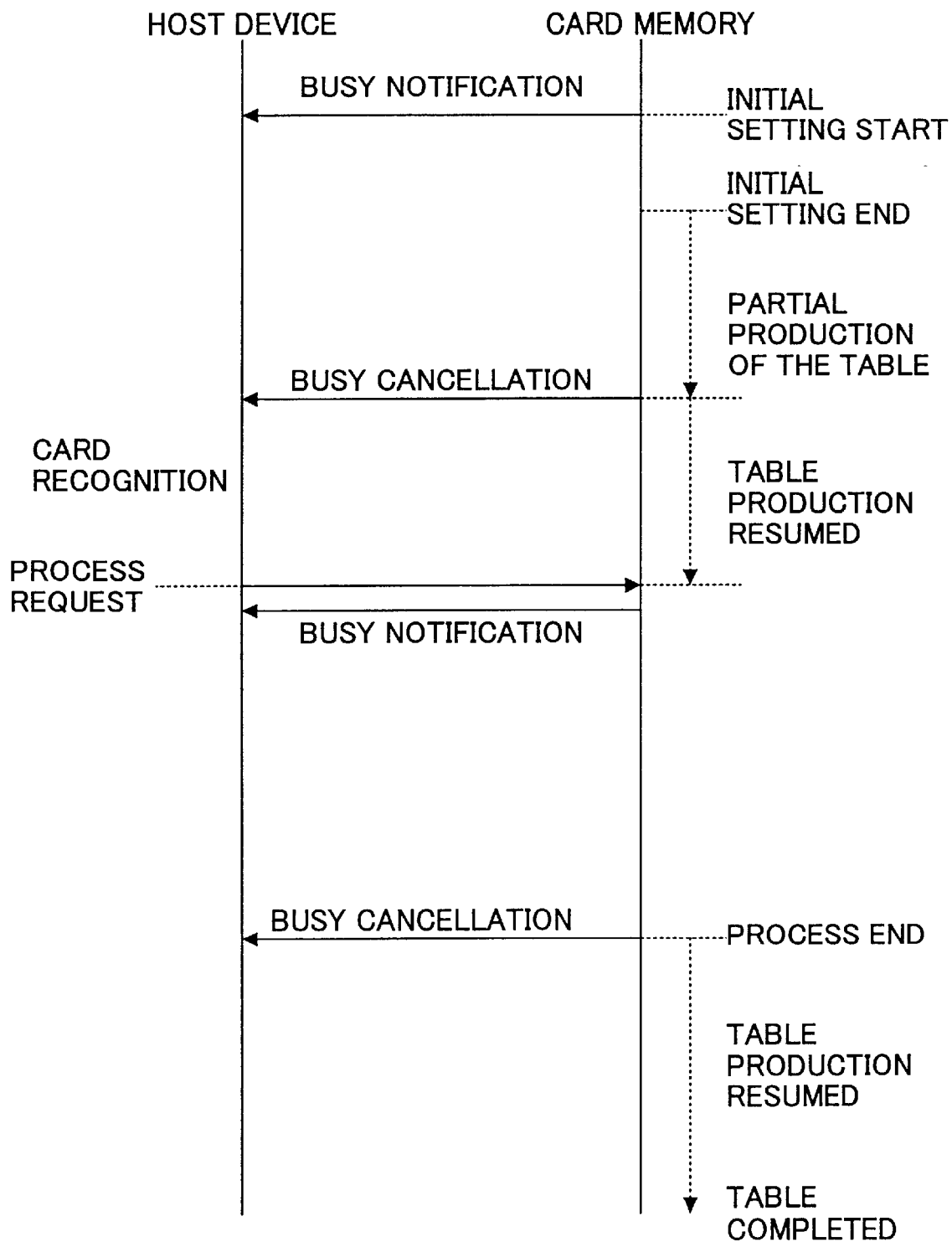
FIG. 18 illustrates a process of producing the memory management table.

In the production processes of this embodiment, as shown in FIG. 18, after the initial setting, a part of the memory management table 230 is produced. The personal computer 2a is then notified of the canceling of the busy state, and the production of the memory management table 230 is resumed. When a process request required for a start-up operation is issued from the personal computer 2a, the production of the memory management table 230 is temporarily stopped, and a process corresponding to the process request is performed. The personal computer is then notified of the canceling of the busy state. If the memory management table 230 is incomplete at this point, the production of the memory management table 230 is continued until a next process request is issued from the personal computer 2a. Thus, the memory management table 230 is completed.

More specifically, the CPU 21 is started by switching the memory card 1a on. In accordance with the program stored in the ROM 22, the personal computer 2a is notified of the busy state in step 61, as shown in the flowchart of FIGS. 16 and 17. In step 62, an initial value is set in each inner register, thereby carrying out the initialization. In step 63, the production of the memory management table 230 is started. In step 64, the production of the memory management table 230 is temporarily stopped, thereby completing only a part of the memory management table 230.

In step 65, the personal computer 2a is notified of the canceling of the busy state. In step 66, the production of the memory management table 230 is resumed. In step 67, the production of the memory management table 230 is continued until a command or an interrupt is issued form the personal computer 2a.

If a command or an interrupt issued from the personal computer 2a is detected in step 67 (the process request issued at this point relates to a start-up operation, instead of an access request using the memory management table 230), the operation moves on to step 68. In step 68, the personal computer 2a is notified of the busy state. In step 69, it is determined whether or not the memory management table 230 is currently being produced. If it is determined that the memory management table 230 is being produced, the operation moves on to step 70. In step 70, the production of the memory management table 230 is temporarily stopped.

In step 71, a process corresponding to a command or an interrupt issued from the personal computer 2a. In step 72 (in the continued flowchart in FIG. 17), the personal computer 2a is notified of the canceling of the busy state. In step 73, it is determined whether or not the memory management table 230 is currently being produced. If it is determined that the memory management table 230 is not being produced, the operation promptly returns to step 67. If it is determined that the memory management table 230 is being produced, the operation moves on to step 74. In step 74, the production of the memory management table 230 is resumed, and the operation then returns to step 67.

In the above manner, in the flowchart of FIGS. 16 and 17, after the initial setting, a part of the memory management table 230 is produced. The personal computer 2a is then notified of the canceling of the busy state. After that, the production of the memory management table 230 is resumed and continued, while no process request is issued from the personal computer 2a.

Figure 19:
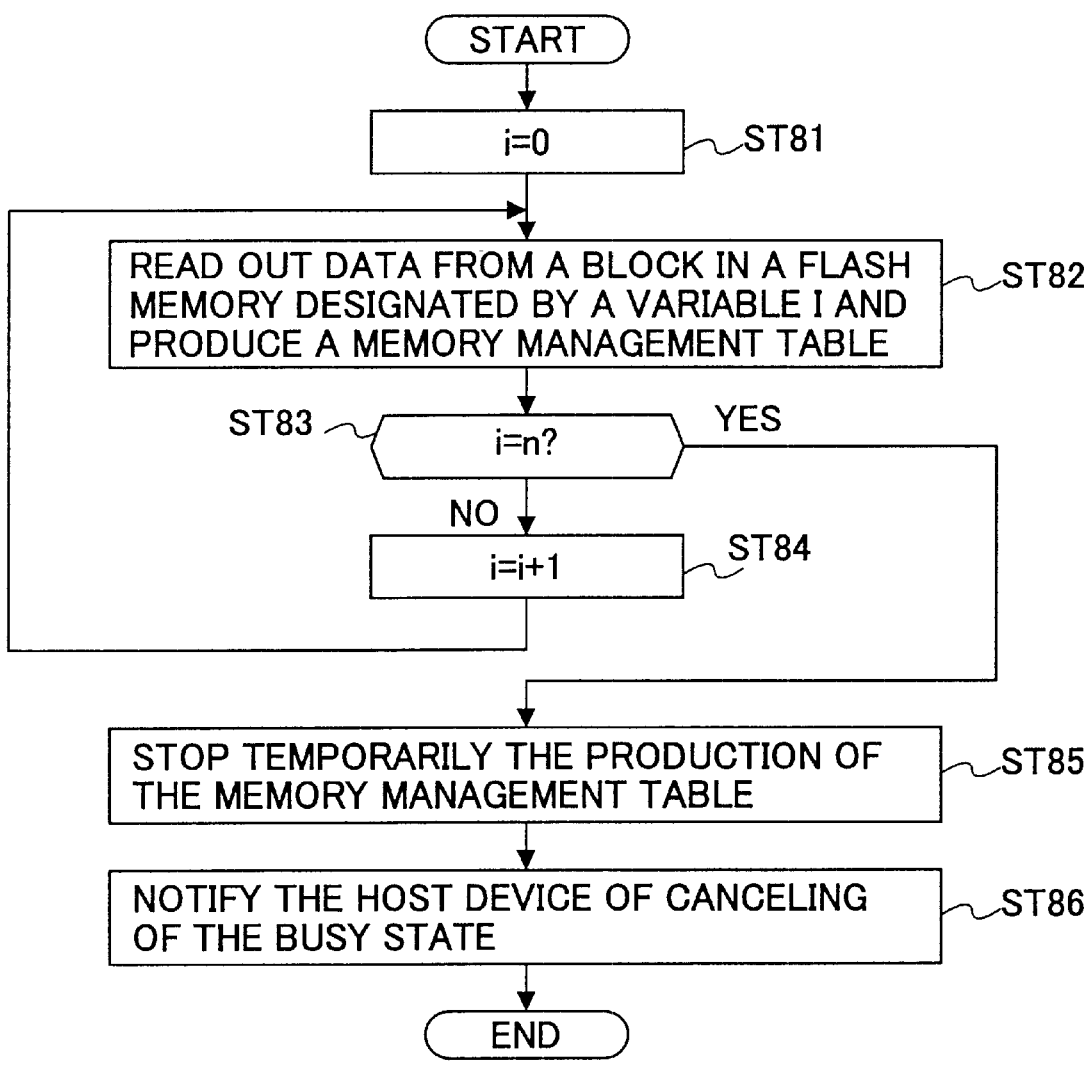
FIG. 19 is a flowchart of a process of producing the memory management table.

In the production process of a part of the memory management table 230, a limitation is imposed on the number of blocks of in the flash memories 20 to be accessed during the production of the table, as shown in the flowchart of FIG. 19. Alternatively, as shown in the flowchart of FIG. 20, a limitation may be imposed on the period of time for accessing the flash memories 20 during the production of the table.

In FIG. 19, a variable i is reset to "0" in step 81. In step 82, data is read out from the blocks in the flash memory 20 designated by the variable i, thereby producing the memory management table 230. In step 83, it is determined whether or not the variable i is equal to a predetermined value n. If it is determined that the variable i is not equal to the predetermined value n, the variable i is incremented by "1" in step 84, and the operation then returns to step 82. On the other hand, if it is determined that the variable i is equal to the predetermined value n, the operation moves on to step 85. In step 85, the production of the memory management table 230 is temporarily stopped. In step 86, the personal computer 2a is notified of the canceling of the busy state.

Figure 20:
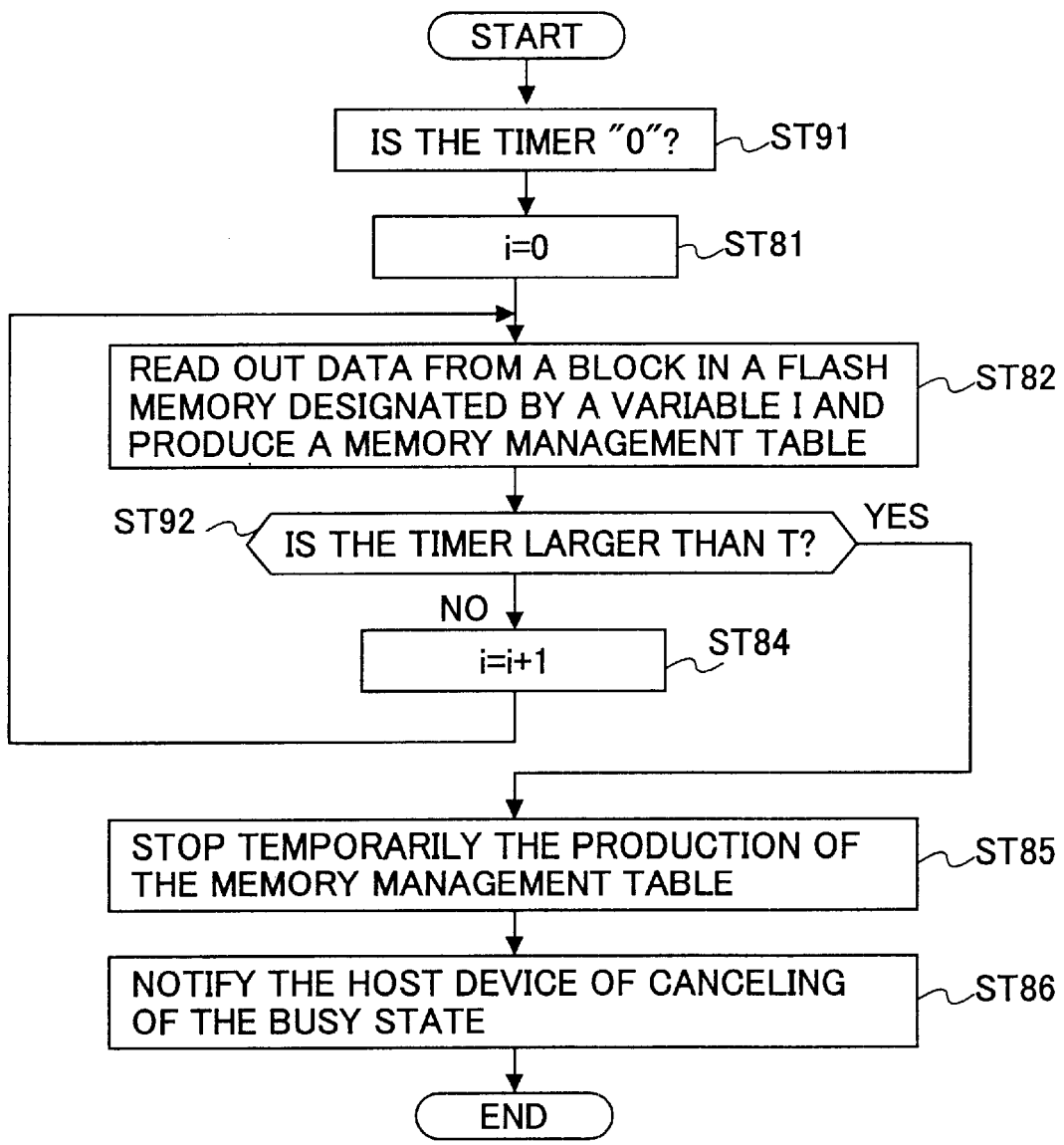
FIG. 20 is a flowchart of a process of producing the memory management table.

In FIG. 20, a timer is reset to "0" in step 91, followed by the same processes as shown in FIG. 19. In step 92, which replaces step 83, it is determined whether or not the timer exceeds a predetermined time T. If it is determined that the timer exceeds the predetermined time T, the operation moves on to step 85.

Figure 21:
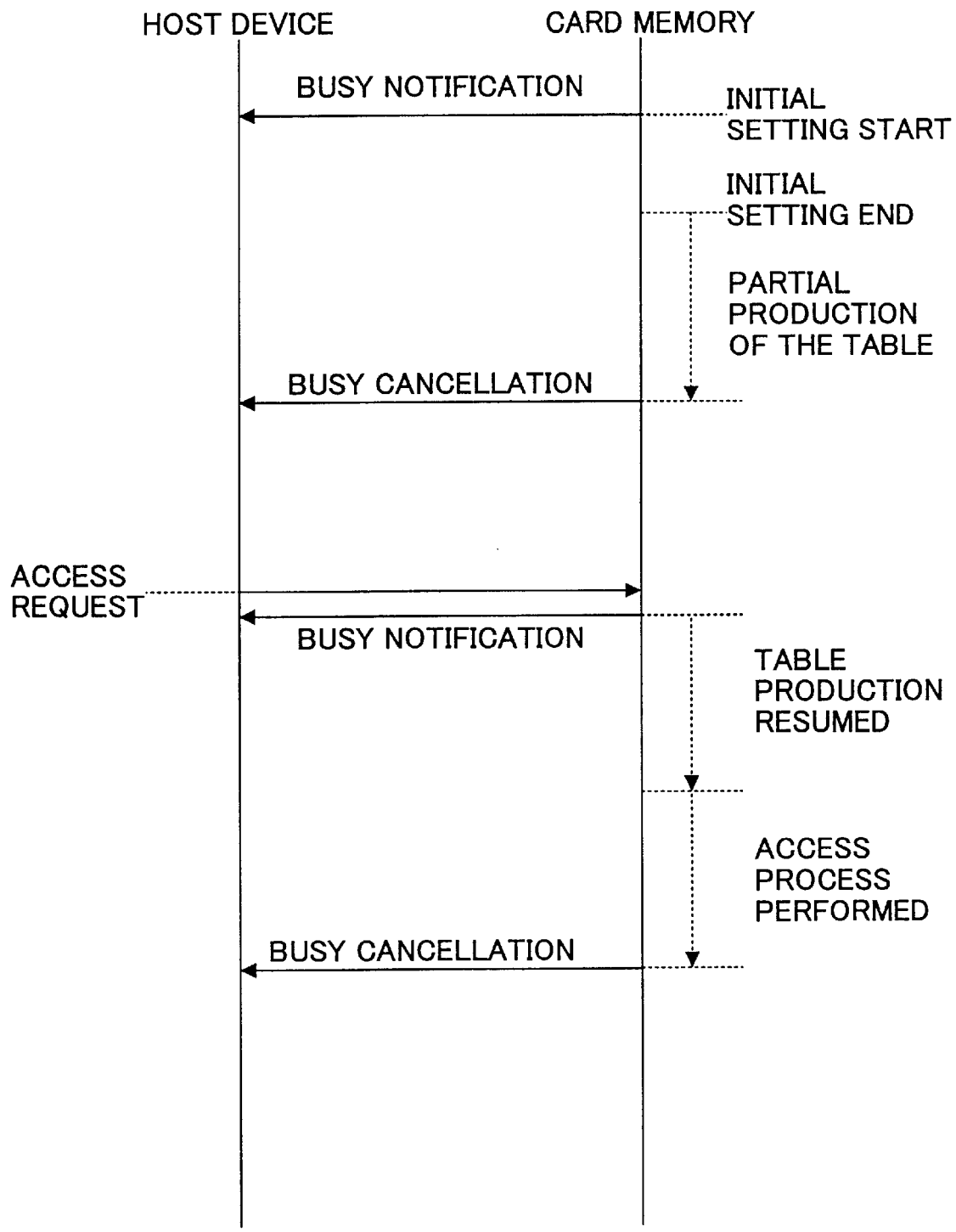
FIG. 21 illustrates a process of producing the memory management table.

In the flowchart of FIGS. 16 and 17, after the initial setting, a part of the memory management table 230 is produced, as shown in FIG. 18. The personal computer 2a is then notified of the canceling of the busy state. After that, the production of the memory management table 230 is resumed and continued while no process request is issued from the personal computer 2a. However, as shown in FIG. 21, when an access request (which is a process request requiring reference to the memory management table 230) designating a logical address is issued from the personal computer 2a, the production of the memory management table 230 may be resumed in synchronization with the issuance of the access request, as shown in the flowchart of FIGS. 10 and 11.

The part of the management table 230 to be produced at this point should preferably be the part corresponding to the logical address (normally a small logical address) designated by the first access request issued from the personal computer 2a. In this manner, the memory management table 230 can be prepared in compliance with the first access request issued from the personal computer 2a.

FIGS. 22 to 25 show embodiments of the processes performed in this structure.

Figure 22:
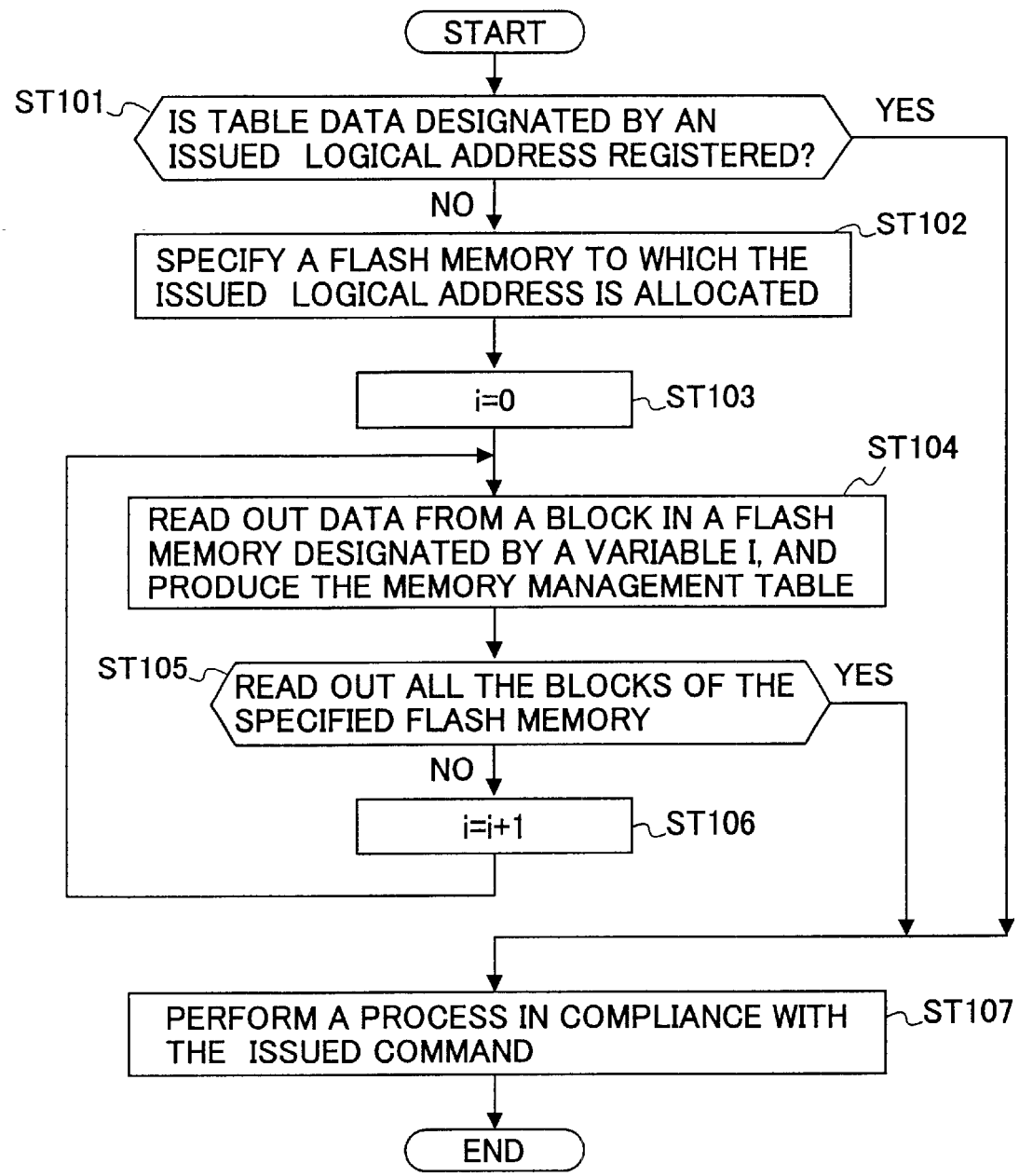
FIG. 22 is a flowchart of a process of producing the memory management table.

In the flowchart shown in FIG. 22, the CPU 21 first determines in step 101 whether or not data is registered in the entry in the memory management table 230 to which the logical address designated by the access request is allocated. If it is determined that data is registered in the designated entry, the operation immediately moves on to step 107, without the production of the memory management table 230, as shown in the flowchart of FIGS. 10 and 11. In step 107, a process corresponding to the issued command is performed.

More specifically, referring to FIG. 3 showing the structure of the memory management table 230, when the logical address "8" is issued, it is determined whether or not data is registered in the entry in the memory management table 230 designated by the chip number "0" and line "2". If it is determined that data is registered in the designated entry, the operation immediately moves on to step 107, and the process corresponding to the issued command is performed.

Meanwhile, if it is determined in step 101 that no data is registered in the designated entry, the operation moves on to step 102. In step 102, the flash memory to which the issued logical address is to be allocated is designated. Referring again to FIG. 3, if the logical address "8" is issued, for instance, the flash memory 20 of the chip number "0" is designated.

In step 103, the variable i is set to "0". In step 104, data is read out from the block designated by the variable i held by the flash memory 20 designated in step 102, thereby extracting the relationship between the block number and the logical address of the data (for instance, the correspondence between the block and the value of the variable I is determined in accordance with the order from the top block).

Based on the relationship, the memory management table 230 is produced.

In step 105, it is determined whether or not the data in all the blocks in the flash memory 20 designated in step 102 has been read out. If it is determined that the data readout has not been completed in all the blocks, the operation moves on to step 106. In step 106, the value of the variable i is incremented by "1", and the operation returns to step 104. If it is determined in step 105 that the data in all the blocks has been read out, the operation moves on to step 107, and the process corresponding to the issued command is performed.

As described above, in accordance with the flowchart of FIG. 22, when it is determined that no data is registered in the entry in the memory management table 230 specified by the logical address designated by the access request, the data in all the blocks in the flash memory 20 to which the logical address is allocated, and the memory management tale 230 is produced based on the read data.

In accordance with the flowchart of FIG. 22, a flash memories 20 which has been once accessed for the production of the memory management table 230 is not to be accessed again for the production of the memory management table 230. However, even if the issued logical address is detected, the process corresponding to the issued command cannot be started until the process of all the blocks in the flash memory 20 is completed.

Figure 23:
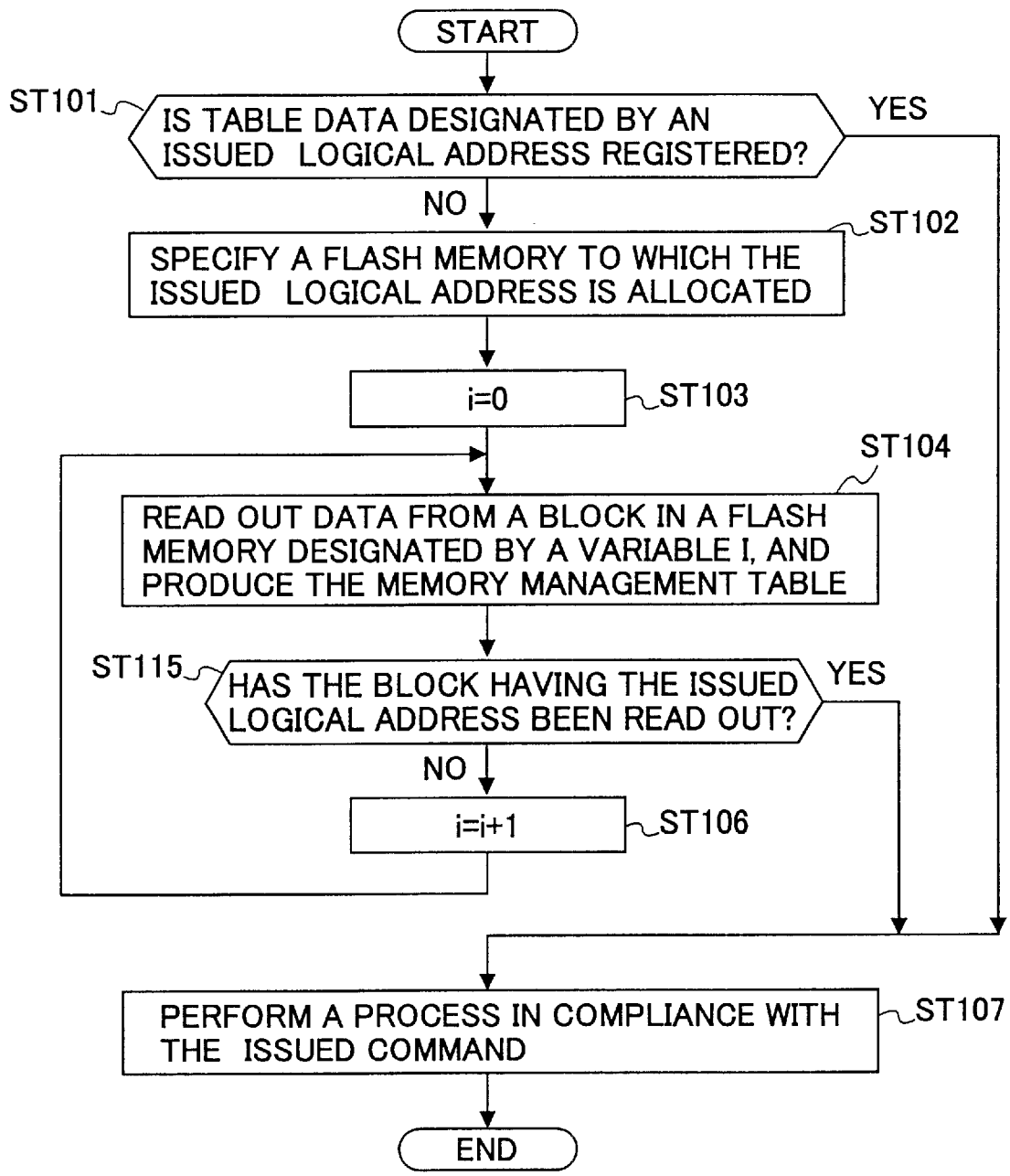
FIG. 23 is a flowchart of a process of producing the memory management table.

To solve this problem, the flowchart of FIG. 23 is carried out, instead of the flowchart of FIG. 22, so as to give priority to the execution of the issued command. When the issued logical address is detected, the production of the memory management table 230 is interrupted, and the process corresponding to the issued command is immediately performed.

In the flowchart of FIG. 23, it is determined whether or not the block having the issued logical address has been read out in step 115, which is equivalent to step 105 in the flowchart of FIG. 22. If it is determined that the block having the issued logical address has been read out, the operation immediately moves on to step 107. In step 107, the process corresponding to the issued command is performed. In this manner, the production of the memory management table 230 is interrupted when the issued logical address is detected, and the process corresponding to the command is immediately performed.

In the flowchart of FIG. 23, at the point where the issued logical address is detected, the production of the memory management table 230 is promptly interrupted. However, the production of the memory management table 230 may be continued to some extent.

Figure 24:
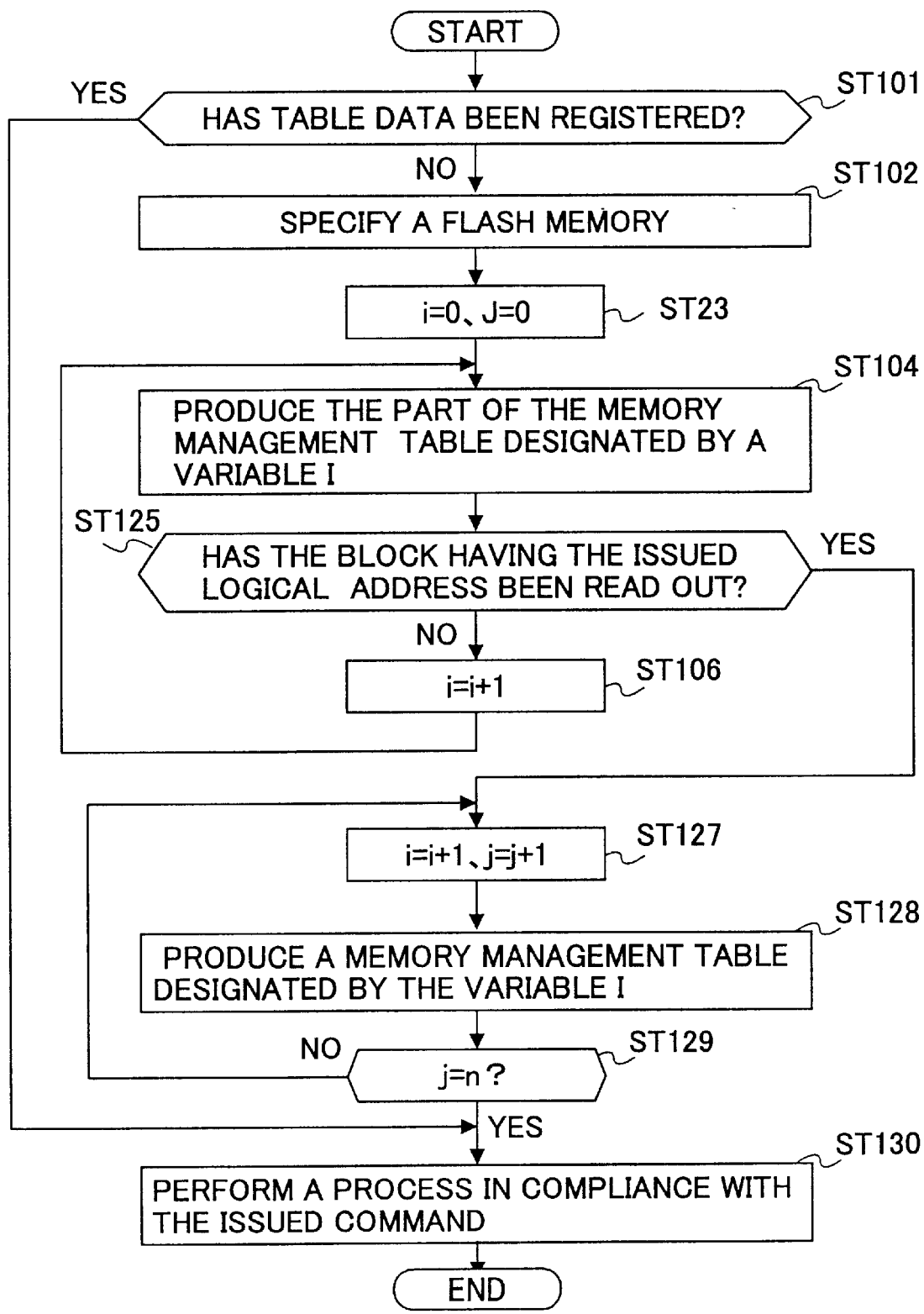
FIG. 24 is a flowchart of a process of producing the memory management table.
Figure 25:
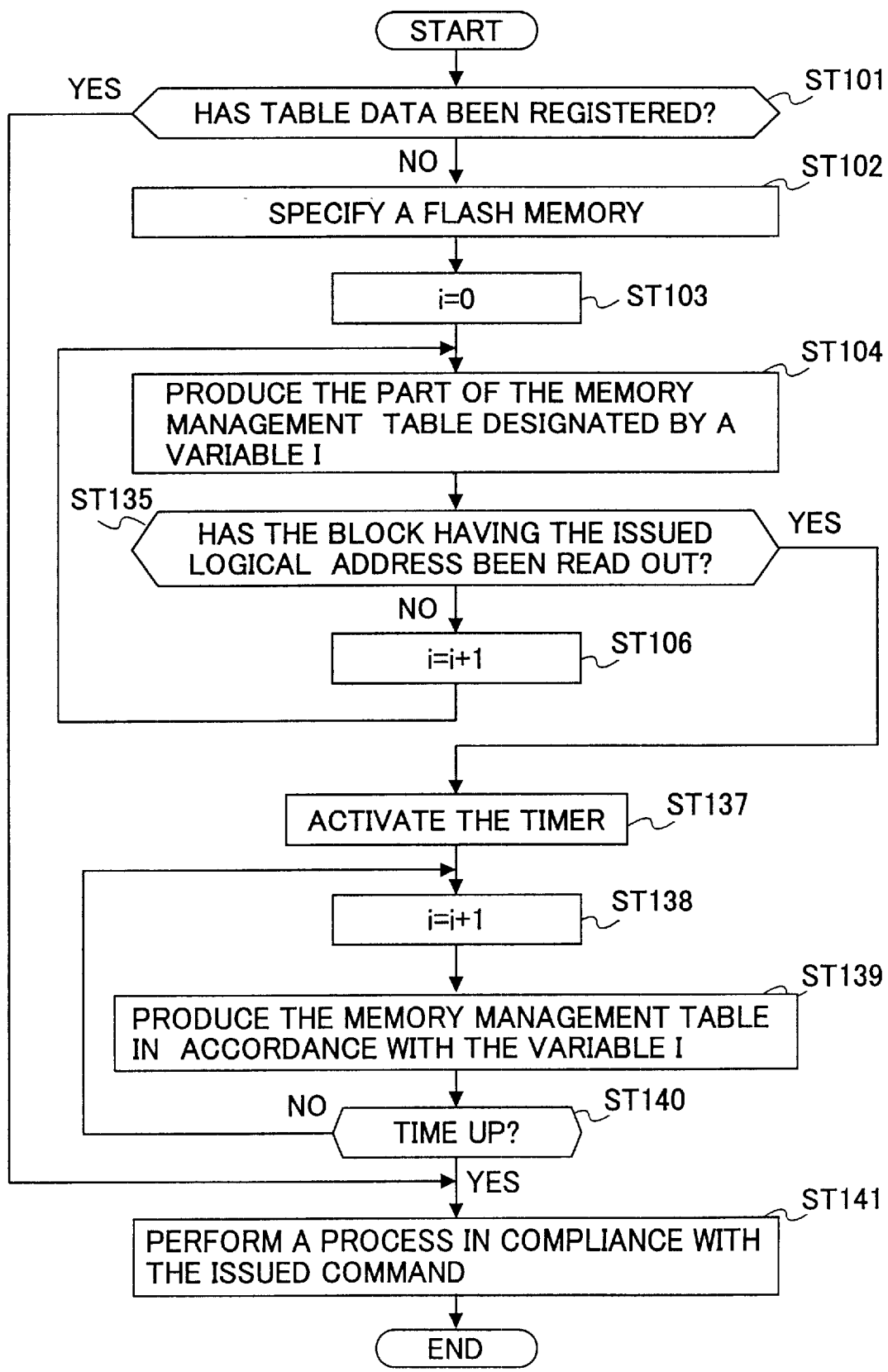
FIG. 25 is a flowchart of a process of producing the memory management table.

FIGS. 24 and 25 shows embodiments of the processes for realizing such a method.

In the flowchart of FIG. 24, a variable j is set to "0" in step 123, which is equivalent to step 103 in the flowchart of FIG. 23. Next, in step 125, which is equivalent to step 115 in the flowchart of FIG. 23, it is determined whether or not the block having the issued logical block has been read out. If it is determined that the block having the issued logical block has been read out, the operation moves on to step 127. In step 127, both the variables i and j are incremented by "1". In step 128, the part of the memory management table 230 designated by the variable i is produced. In step 129, it is determined whether or not the variable j has reached a predetermined value. If it is determined that the variable j has not reached the predetermined value, the operation returns to step 127. If it is determined that the variable j has reached the predetermined value, the operation moves on to step 130. In step 130, the process corresponding to the issued command is performed. In this manner, from the point where the issued logical address is detected, the production of the memory management table 230 is resumed and continued to some extent.

In the flowchart of FIG. 25, it is determined whether or not the block having the issued logical address has been read out in step 135, which is equivalent to step 115 in the flowchart of FIG. 23. If it is determined that the block having the issued logical address has been read out, the operation moves on to step 137, and the timer is activated. In step 138 the variable i is incremented by "1". In step 139, the part of the memory management table 230 designated by the variable i is produced. In step 140, it is determined whether or not the timer has reached a predetermined period of time. If it is determined that the timer has not reached the predetermined period of time, the operation returns to step 138. If it is determined that the timer has reached the predetermined period of time, the operation moves on to step 141. In step 141, the process corresponding to the issued command is performed. In this manner, form the point where the issued logical address is detected, the production of the memory management table 230 is resumed and continued to some extent.

Figure 26:
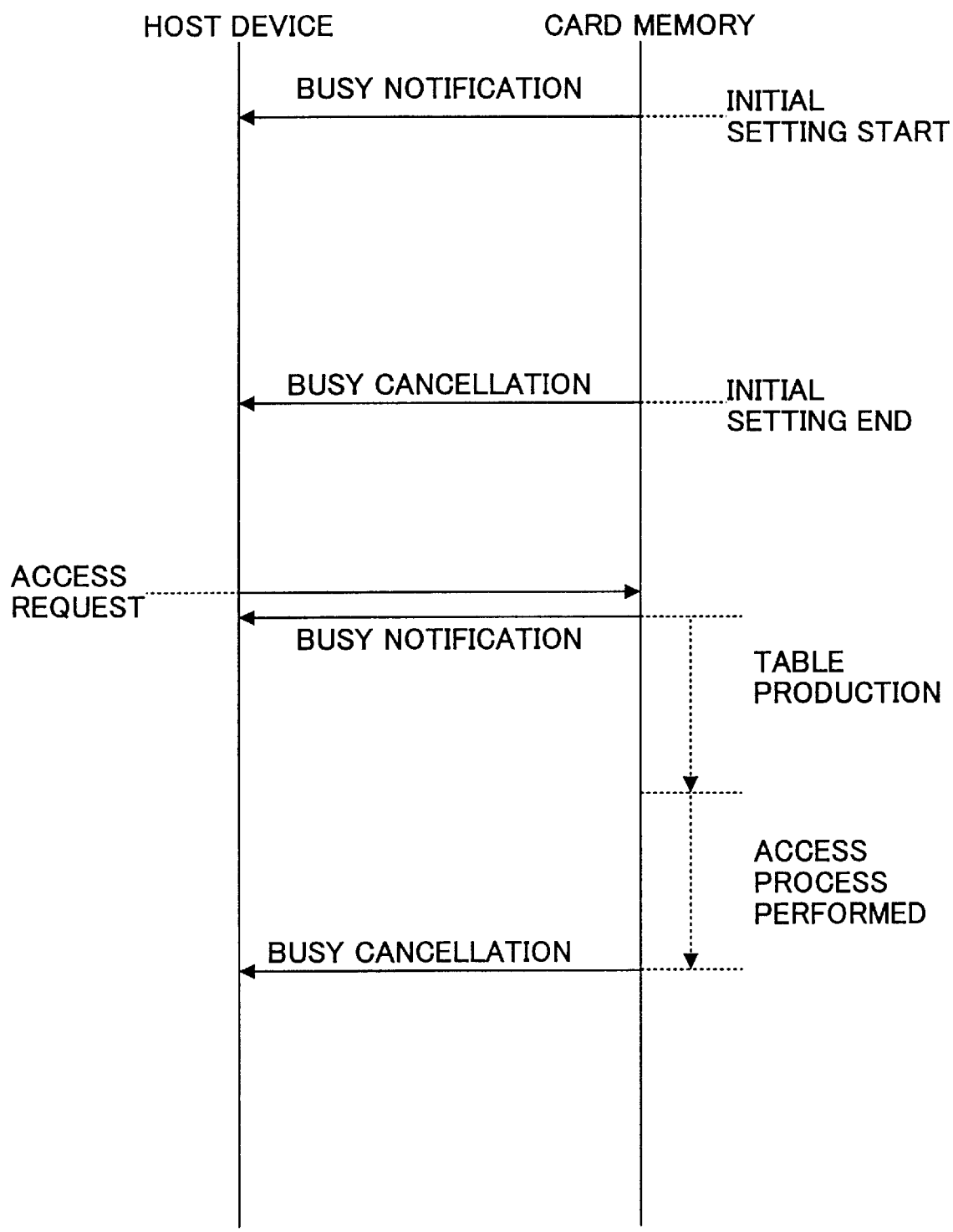
FIG. 26 illustrates a process of producing a memory management table.

In the flowcharts of FIGS. 22 to 25, at the point where the access request issued as shown in FIG. 21, the production of the incomplete part of the memory management table 230 is started. More specifically, after the initial setting, a part of the memory management table 230 is produced, and the personal computer 2a is notified of the canceling of the busy state. When an access request is issued, the processes specified in any one of the flowcharts of FIGS. 2 to 25 are carried out, thereby producing the memory management table 230. However, it is also possible to start the production of the memory management table 230 at the time of the issuance of the access-request, as shown in FIG. 26.

On other words, after the initial setting, the personal computer 2a is immediately notified of the canceling of the busy state. After that, the memory management table 230 may be produced when the access request is issued.

Although the present invention has been described by way of examples, the present invention is not limited by those examples. For instance, the flash memories 20 are mounted in the above embodiments, but the application of the present invention is not limited to the flash memories 20. On the contrary, the present invention may be applied to non-volatile memories of other types or volatile memories backed up by batteries.

As described so far, when a memory management table used for a conversion process between a logical address and a physical address is produced in the memory device of the present invention, a host device is immediately notified of canceling of a busy state, without the production of the memory management table, unlike the prior art in which the host device is notified of the canceling of the busy state after the initial setting and the completion of the memory management table. An incomplete part of the memory management table may be produced until the host device issues a process request, or the incomplete part specified by the logical address designated by a process request is produced when the host device issues the process request. Thus, the memory management table is completed. Once the memory device is activated, the host device can promptly perform the processes.

Furthermore, the host device can promptly recognize that the memory device is working properly, and no wrong judgment that there is an error caused in the memory device is made. Without wrong judgment, the processes can be promptly started.

What is claimed is:

1. A method of producing a memory management table which serves to control one or a plurality of memories having a function to hold data while power is cut off, and manages identifier information of memory areas which are data storage destinations each indicated by a logical address issued by a host device, said method comprising the steps of:

notifying the host device of canceling of a busy state;

starting production of an incomplete part of the memory management table;

accessing the one or the plurality of memories until a process request is issued from the host device, with the memory areas being units, so as to acquire a logical address held by data stored in an accessed one of the memory areas; and completing the incomplete part of the memory management table based on the acquired logical address and the identifier information of the accessed one of the memory areas.

2. A method of producing a memory management table which serves to control one or a plurality of memories having a function to hold data while power is cut off, and manages identifier information of memory areas which are data storage destinations each indicated by a logical address issued by a host device, said method comprising:

starting production of an incomplete part of the memory management table when a process request is issued from the host device;

accessing the one or the plurality of memories to which a logical address designated by the process request is allocated, with the memory areas being units, to acquire a logical address held by data stored in an accessed one of the memory areas;

completing the incomplete part of the memory management table based on the acquired logical address and the identifier information of the accessed one of the memory areas; and imposing a limitation on the number of memory areas to be accessed, after detecting an access to a memory area having the logical address designated by the process request, thereby interrupting the production of the incomplete part of the memory management table.

3. The method as claimed in claim 2, further comprising the step of interrupting the production of the incomplete part of the memory management table when an access to all memory areas in the one or the plurality of memories to which the logical address designated by the process request is allocated is ended.

4. The method as claimed in claim 2, further comprising interrupting the production of the incomplete part of the memory management table when an access to a memory area having the logical address designated by the process request is detected.

5. The method as claimed in claim 2, further comprising the step of imposing a limitation on an access time, after detecting an access to a memory area having the logical address designated by the process request, thereby interrupting the production of the incomplete part of the memory management table.

6. A method of producing a memory management table which serves to control one or a plurality of memories having a function to hold data while power is cut off, and manages identifier information of memory areas which are data storage destinations each indicated by a logical address issued by a host device, said method comprising the steps of:

notifying the host device of canceling of a busy state, immediately after an initial setting process at a time of memory activation, without production of the memory management table;

start the production of the memory management table;

accessing the one or the plurality of memories until a process request is issued from the host device, with the memory areas being units, so as to acquire a logical address held by data stored in an accessed one of the memory areas; and completing the memory management table based on the acquired logical address and the identifier information of the accessed one of the memory areas.

7. A method of producing a memory management table which serves to control one or a plurality of memories having a function to hold data while power is cut off, and manages identifier information of memory areas which are data storage destinations each indicated by a logical address issued by a host device, said method comprising:

starting production of one part of the memory management table after an initializing process at a time of memory activation;

accessing the one or the plurality of memories, with the memory areas being units, to acquire a logical address stored in an accessed one of the memory areas;

completing the one part of the memory management table based on the acquired logical address and the identifier information of the accessed one of the memory areas;

notifying the host device of canceling of a busy state; and imposing a limitation on an access time at the time of memory activation, thereby determining which part of the memory management table is to be produced.

8. The method as claimed in claim 7, further comprising the step of imposing a limitation on the number of memory areas to be accessed at the time of memory activation, thereby determining which part of the memory management table is to be produced.

9. A method of producing a memory management table which serves to control one or a plurality of memories having a function to hold data while power is cut off, and manages identifier information of memory areas which are data storage destinations each indicated by a logical address issued by a host device, said method comprising:

starting production of one part of the memory management table after an initializing process at a time of memory activation;

accessing the one or the plurality of memories, with the memory areas being units, to acquire a logical address held by data stored in an accessed one of the memory areas;

completing the one part of the memory management table based on the acquired logical address and the identifier information of the accessed one of the memory areas;

notifying the host device of canceling of a busy state;

starting production of an incomplete part of the memory management table;

accessing the one of the plurality of memories until a process request is issued from the host device, with the memory areas being units, to acquire a logical address held by data stored in an accessed one of the memory areas;

completing the memory management table based on the acquired logical address and the identifier information of the accessed one of the memory areas; and imposing a limitation on an access time at the time of memory activation, thereby determining which part of the memory management table is to be produced.

10. A method of producing a memory management table which serves to control one or a plurality of memories having a function to hold data while power is cut off, and manages identifier information of memory areas which are data storage destinations each indicated by a logical address issued by a host device, said method comprising:

notifying the host device of canceling of a busy state immediately after an initializing process at a time of memory activation, without producing the memory management table;

starting an incomplete part of the memory management table when a process request is issued from the host device;

accessing the one or the plurality of memories to which a logical address designated by the process request is allocated, with the memory areas being units, to acquire a logical address held by data stored in an accessed one of the memory areas;

completing the incomplete part of the memory management table based on the acquired logical address and the identifier information of the accessed one of the memory areas; and imposing a limitation on the number of memory areas to be accessed after an access to one of the memory areas having the logical address designated by the process request is detected, thereby interrupting the production of the incomplete part of the memory management table.

11. The method as claimed in claim 10, further comprising the step of interrupting the production of the incomplete part of the memory management table, when an access to all the memory areas in the one or the plurality of memories to which the logical address designated by the process request is allocated is terminated.

12. The method as claimed in claim 10, further comprising the step of interrupting the production of the incomplete part of the memory management table, when an access to one of the memory areas having the logical address designated by the process request is detected.

13. The method as claimed in claim 10, further comprising the step of imposing a limitation on an access time after an access to one of the memory areas having the logical address designated by the process request is detected, thereby interrupting the production of the incomplete part of the memory management table.

14. A method of producing a memory management table which serves to control one or a plurality of memories having a function to hold data while power is cut off, and manages identifier information of memory areas which are data storage destinations each indicated by a logical address issued by a host device, said method comprising:

starting one part of the memory management table after an initializing process at a time of memory activation;

accessing the one or the plurality of memories, with the memory areas being units, to acquire a logical address held by data stored in an accessed one of the memory areas;

completing the one part of the memory management table based on the acquired logical address and the identifier information of the accessed one of the memory areas;

notifying the host device of canceling of a busy state;

starting production of an incomplete part of the memory management table when a process request is issued from the host device;

accessing the one or the plurality of memories to which a logical address designated by the process request is allocated, with the memory areas being units, to acquire a logical address held by data stored in an accessed one of the memory areas;

completing the incomplete part of the memory management table based on the acquired logical address and the identifier information of the accessed one of the memory areas; and imposing a limitation on an access time at the time of memory activation, thereby determining which part of the memory management table is to be produced.

15. The method as claimed in claim 14, further comprising the step of imposing a limitation on the number of memory areas to be accessed at the time of memory activation, thereby determining which part of the memory management table is to be produced.

16. A memory device comprising:

a CPU;

one or a plurality of memories having a function to hold data at a time of power cut-off;

a controller that controls the one or the plurality of memories by issuing a command to the one or the plurality of memories in compliance with an instruction issued from the CPU;

a detecting unit that determines whether or not a process request has been issued from a host device; and a producing unit that performs the processes of:

notifying the host device of canceling of a busy state;

starting producing an incomplete part of a memory management table which manages identification information of memory areas to be data storage destinations designated by a logical address issued from the host device;

accessing the one or the plurality of memories until the detecting unit detects the process request issued from the host device, with the memory areas being units, so as to acquire a logical address held by data stored in an accessed one of the memory areas; and completing the incomplete part of the memory management table based on the acquired logical address and the identifier information of the accessed one of the memory areas.

17. A memory device comprising:

a CPU;

one or a plurality of memories having a function to hold data at a time of power cut-off;

a controller that controls the one or the plurality of memories by issuing a command to the one or the plurality of memories in compliance with an instruction issued from the CPU;

a detecting unit that determines whether or not a process request has been issued from a host device; and a producing unit that performs the processes of:

starting production of an incomplete part of a memory management table which manages identifier information of memory areas to be data storage destinations designated by a logical address issued from the host device, when the detecting unit detects the process request issued from the host device, accessing the one or the plurality of memories to which a logical address designated by the process request is allocated, with the memory areas being units, to acquire a logical address held by data stored in an accessed one of the memory areas, completing the incomplete part of the memory management table based on the acquired logical address and the identifier information of the accessed one of the memory areas, and imposing a limitation on the number of memory areas to be accessed, after detecting an access to a memory area having the logical address designated by the process request, thereby interrupting the production of the incomplete part of the memory management table.

* * * * *